(12) United States Patent
Yamato et al.

(10) Patent No.: US 10,200,307 B2
(45) Date of Patent: Feb. 5, 2019

(54) COMMUNICATION SYSTEM, CONTROL DEVICE, PROCESSING RULE SETTING METHOD, PACKET TRANSMISSION METHOD, AND PROGRAM

(71) Applicant: NEC Corporation, Tokyo (JP)

(72) Inventors: Junichi Yamato, Tokyo (JP); Takayuki Hama, Tokyo (JP); Satoshi Hieda, Tokyo (JP); Satoshi Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/266,183

(22) Filed: Sep. 15, 2016

(65) Prior Publication Data

US 2017/0005950 A1 Jan. 5, 2017

Related U.S. Application Data

(63) Continuation of application No. 13/137,168, filed on Jul. 25, 2011, now abandoned, which is a (Continued)

(30) Foreign Application Priority Data

Jan. 5, 2010 (JP) .................................. 2010-000740

(51) Int. Cl.
*H04L 12/947* (2013.01)
*H04L 12/715* (2013.01)
*H04L 12/751* (2013.01)

(52) U.S. Cl.
CPC .............. *H04L 49/25* (2013.01); *H04L 45/02* (2013.01); *H04L 45/04* (2013.01)

(58) Field of Classification Search
USPC ....... 370/230, 248, 252, 254, 255, 328, 351, 370/389, 392, 408, 420, 428, 503, 507, (Continued)

(56) References Cited

U.S. PATENT DOCUMENTS 5,758,083 A * 5/1998 Singh .................... H04L 41/042
370/229
5,805,072 A * 9/1998 Kakemizu ........... H04L 12/5602
370/351

(Continued)

FOREIGN PATENT DOCUMENTS

CN 101415023 A 4/2009
EP 1 653 686 A1 5/2006

(Continued)

OTHER PUBLICATIONS

H. Ueno et al., "A study on Deployment of Network Appliance Functionalities in Datacenter Network", IEICE Technical Report, vol. 109, No. 296, Nov. 2009.

(Continued)

*Primary Examiner* — Kevin C. Harper
*Assistant Examiner* — Mon Cheri S Davenport
(74) *Attorney, Agent, or Firm* — Finnegan, Henderson, Farabow, Garrett & Dunner, L.L.P.

(57) ABSTRACT

A communication system comprises control devices, and forwarding nodes each includes packet processing unit that performs processing of a received packet based on a processing rule set in advance or received from control device associated with the node. First control device among the control devices, in response to a predetermined trigger, refers to correspondence between forwarding nodes and control devices, and transmits, among forwarding path information, at least forwarding path information that includes a forwarding node associated with the first control device, to second control device associated with a forwarding node that is not associated with first control device, among forwarding nodes on a forwarding path of the received packet. Second control device generates and sends the processing rule to a forwarding node on the forwarding path, (Continued)

among forwarding nodes associated with the second control device, based on the forwarding path information.

9 Claims, 23 Drawing Sheets

Related U.S. Application Data continuation of application No. PCT/JP2011/050009, filed on Jan. 4, 2011.

(58) Field of Classification Search
USPC .................................................. 370/509, 512
See application file for complete search history.

(56) References Cited

U.S. PATENT DOCUMENTS

| | | | |
|---|---|---|---|
| 6,671,819 B1 | 12/2003 | Passman et al. | |
| 2004/0068580 A1 | 4/2004 | Jo et al. | |
| 2005/0111356 A1* | 5/2005 | Whittaker Stewart | H04L 45/42 370/229 |
| 2007/0047465 A1 | 3/2007 | Kano | |
| 2007/0211623 A1 | 9/2007 | Nishioka | |
| 2010/0265943 A1 | 10/2010 | Dong et al. | |
| 2011/0142053 A1* | 6/2011 | Van Der Merwe | H04L 47/72 370/395.1 |

FOREIGN PATENT DOCUMENTS

| | | |
|---|---|---|
| EP | 1653688 A1 | 5/2006 |
| JP | 2004-129156 A | 4/2004 |
| JP | 2005-012317 A | 1/2005 |
| JP | 2005-223573 A | 8/2005 |
| JP | 2007-060461 A | 3/2007 |
| JP | 2008-206095 A | 9/2008 |
| JP | 2009-539156 | 11/2009 |
| WO | WO 2009/042919 A2 | 4/2009 |
| WO | WO 2009/092252 A1 | 7/2009 |

OTHER PUBLICATIONS

Japanese Office Action dated May 24, 2016, by the Japanese Patent Office in counterpart Japanese Patent Application No. 2015-135096.
Chinese Notice of Grant dated Aug. 9, 2015 with an English translation thereof.
Japanese Office Action dated Apr. 7, 2015 with a partial English translation.
Japanese Office Action dated Sep. 16, 2014 with a partial English translation.
Kentaro Ogawa, et al., "Fault Management in Functionality Distributed Transport Networking for Large Scale Networks", INCOS '09, IEEE, Nov. 2009, pp. 378-382, (Abstract attached).
N. McKeown et al., "OpenFlow: Enabling Innovation in Campus Networks", Mar. 14, 2008, Internet URL: http://www.OpenFlowswitch.org//documents/OpenFlow-wp-latest.pdf.
"OpenFlow: Switch Specification" Version 0.9.0 (Wire Protocol 0x98), Jul. 20, 2009, Internet URL: http://www.openflowswitch.org/documents/openflow-spec-v0.9.0.pdf.
International Search Report—FormPCT/ISA/210 (second sheet), dated Jul. 2009.
Written Opinion of the International Searching Authority—Form PCT/ISA/237, dated Jul. 2009.
"Anonymous", "Open-Flow Switch Specification, Version 1.0.0 (Wire Protocol 0x01)", Dec. 31, 2009, pp. 1-42, XP055403757A.
Extended European Search Report dated Sep. 15, 2017, issued in counterpart EP Application No. 11731778.4.

\* cited by examiner

FIG. 7

|          | INTERFACE 1 | INTERFACE 2 |
|----------|-------------|-------------|
| OFS301A  | NODE A      | OFS302A     |
| OFS302A  | OFS301A     | OFS301B     |
| OFS301B  | OFS302A     | OFS302B     |
| OFS302A  | OFS301B     | NODE D      |

FIG. 8

|  | CONNECTED SWITCH | | |
|---|---|---|---|
| OFC;100A | OFS;301A | OFS;302A |
| OFC;100B | OFS;301B | OFS;302B |

FIG. 10

| Wildcards | In Port | Ether SA | Ether DA | Ether type | VLAN ID | IP SA | IP DA | IP proto | Src port | Dst port | ACTION (Actions) | Stats |

{ RULE }

FIG. 11

- OFS;301A
  - RULE
    - IP SA: IP OF NODE A
    - IP DA: IP OF NODE D
    - REMAINING WILD CARDS
  - ACTION
    - FORWARDING TO INTERFACE 2
- OFS;302A
  - RULE
    - IP SA: IP OF NODE A
    - IP DA: IP OF NODE D
    - REMAINING WILD CARDS
  - ACTION
    - FORWARDING TO INTERFACE 2
- OFS;301B
  - RULE
    - IP SA: IP OF NODE A
    - IP DA: IP OF NODE D
    - REMAINING WILD CARDS
  - ACTION
    - FORWARDING TO INTERFACE 2
- OFS;302B
  - RULE
    - IP DA: IP OF NODE A
    - IP DA: IP OF NODE D
    - REMAINING WILD CARDS
  - ACTION
    - FORWARDING TO INTERFACE 2

- OFS;301A
  - RULE
    - IP SA: IP OF NODE D
    - IP DA: IP OF NODE A
    - REMAINING WILD CARDS
  - ACTION
    - FORWARDING TO INTERFACE 1
- OFS;302A
  - RULE
    - IP SA: IP OF NODE D
    - IP DA: IP OF NODE A
    - REMAINING WILD CARDS
  - ACTION
    - FORWARDING TO INTERFACE 1
- OFS;301B
  - RULE
    - IP SA: IP OF NODE D
    - IP DA: IP OF NODE A
    - REMAINING WILD CARDS
  - ACTION
    - FORWARDING TO INTERFACE 1
- OFS;302B
  - RULE
    - IP SA: IP OF NODE D
    - IP DA: IP OF NODE A
    - REMAINING WILD CARDS
  - ACTION
    - FORWARDING TO INTERFACE 1

FIG. 23

| ACTION NAMES | ACTION CONTENTS |
| --- | --- |
| OUTPUT | OUTPUT TO SPECIFIED PORT |
| SET_VLAN_VID | ADD/UPDATE VLAN Tag BY SPECIFIED VLAN ID |
| SET_VLAN_PCP | ADD/UPDATE VLAN Tag BY SPECIFIED VLAN Priority |
| STRIP_VLAN | RELEASE IEEE802.1q VLAN Tag |
| SET_DL_SRC | UPDATE MAC SA |
| SET_DL_DST | UPDATE MAC DA |
| SET_NW_SRC | UPDATE IP SA |
| SET_NW_DST | UPDATE IP DA |
| SET_TP_SRC | UPDATE TCP/UDP SOURCE PORT |
| SET_TP_DST | UPDATE TCP/UDP DESTINATION PORT |
| VENDOR | VENDER DEFINED ACTION |

COMMUNICATION SYSTEM, CONTROL DEVICE, PROCESSING RULE SETTING METHOD, PACKET TRANSMISSION METHOD, AND PROGRAM

REFERENCE TO RELATED APPLICATION

This application is a continuation of U.S. application Ser. No. 13/137,168, filed Jul. 25, 2011, which is a continuation of International Application No. PCT/JP2011/050009, filed on Jan. 4, 2011, which is based upon and claims the benefit of the priority of Japanese Patent Application No. 2010-000740 filed on Jan. 5, 2010. The contents of the above-referenced applications are expressly incorporated herein by reference.

TECHNICAL FIELD

The present invention relates to a communication system, a control device, a processing rule setting method, a packet transmission method, and a program, and in particular relates to a communication system, a control device, a processing rule setting method used in the forwarding, a packet transmission method, and a program, for realizing communication by forwarding a packet by forwarding nodes disposed in a network.

BACKGROUND

In recent years, technology known as OpenFlow has been proposed (refer to Non-Patent Document 1). In OpenFlow, communication is taken as end-to-end flow, and path control, recovery from failure, load balancing, and optimization are performed in flow units. An OpenFlow switch functioning as a forwarding node is provided with a secure channel for communication with an OpenFlow controller that is regarded as a control device, and operates according to a flow table in which appropriate addition or rewriting is instructed by the OpenFlow controller. In the flow table are definitions of sets of rules for collation with packet headers, actions (Actions) defining processing content, and flow statistical information (Stats), for each flow (refer to FIG. 10).

FIG. 23 shows an example of action names and action content defined in Non-Patent Document 2. OUTPUT is an action for outputting to a specific port (interface). From SET_VLAN_VID to SET_TP_DST are actions for correcting fields of a packet header.

For example, when an OpenFlow switch receives a packet, an entry is searched for that has a rule (FlowKey) matching header information of the received packet, from the flow table. As a result of the search, in a case where an entry matching the received packet is found, the OpenFlow switch executes processing content described in an Actions field of the entry in question, for the received packet. On the other hand, as a result of the search, in a case where an entry matching the received packet is not found, the OpenFlow switch forwards the received packet to the OpenFlow controller via a secure channel, requests determination of a path of the packet based on source and destination of the received packet, receives a flow entry for realizing this, and updates the flow table. In this way, the OpenFlow switch uses the entry contained in the flow table as a processing rule to perform packet forwarding.

Non-Patent Document 1

Nick McKeown, and 7 others, "OpenFlow: Enabling Innovation in Campus Networks," [online], [search conducted Dec. 14, 2009] Internet URL: http://www.openflowswitch.Org//documents/openflow-wp-latest.pdf [Non-Patent Document 2]

"OpenFlow: Switch Specification" Version 0.9.0. (Wire Protocol 0x98), [search conducted Dec. 14, 2009] Internet URL: http://www.openflowswitch.Org/documents/openflow-spec-v0.9.0.pdf

SUMMARY

The entire disclosures of the abovementioned Non-Patent Documents 1 and 2 are incorporated herein by reference thereto. The following analysis is given by the present invention. In a case where multiple OpenFlow switches are connected to a network, however, there is a problem in that path calculations in an OpenFlow controller and the amount of processing required for allotment of entries in a flow table based on a result thereof increase, so that the time from receiving a request to create a path from an OpenFlow switch until a response is given becomes long.

With regard to this point, Non-Patent Document 1, as an explanation of FIG. 2 thereof, has a description of "all the flow tables are managed by the same controller," and merely describes that in an OpenFlow protocol a certain OpenFlow switch is allowed to be controlled by two or more controllers in order to improve performance and robustness. Furthermore, Non-Patent Document 2, in "4.3 Connection Interruption," merely describes that in a case where a certain OpenFlow switch misses a controller, an attempt is made to connect to a backup controller.

The present invention has been made in light of the abovementioned situations, and it is an object thereof to provide a configuration that can ensure performance not less than a predetermined level even in a case where a plurality of forwarding nodes exist, as in the example of abovementioned OpenFlow switches.

According to a first aspect of the present invention, there is provided a communication system, comprising a plurality of forwarding nodes and a plurality of control devices, wherein each of the plurality of forwarding nodes comprises a packet processing unit that performs processing of a received packet based on a processing rule set in advance or received from a control device associated with an own forwarding node, and the plurality of control devices includes a first control device that comprises: a correspondence management unit that stores correspondence between each of the plurality of forwarding nodes and each of the plurality of control devices; and a path transmission unit that, in response to a predetermined trigger, refers to the correspondence between each of the plurality of forwarding nodes and each of the plurality of control devices, and transmits, among forwarding path information, forwarding path information that includes at least a forwarding node associated with the own first control device, to an other second control device associated with a forwarding node that is not associated with the own first control device, among forwarding nodes on a forwarding path of a received packet.

According to a second aspect of the present invention, there is provided a first control device, which is connected to a plurality of forwarding nodes, each of the plurality of the forwarding nodes comprising a packet processing unit that performs processing of a received packet based on a processing rule set in advance or received from a control device associated with a forwarding node(s), wherein the first control device comprises:

a correspondence management unit that stores a correspondence between each of a forwarding nodes group including the plurality of forwarding nodes and each of a plurality of control devices; and a path transmission unit that, in response to a predetermined trigger, refers to the correspondence between each of the forwarding nodes and each of the plurality of control devices, and transmits, among forwarding path information, forwarding path information that includes at least a forwarding node associated with the own first control device, to an other second control device associated with a forwarding node that is not associated with the own first control device, among forwarding nodes on a forwarding path of a received packet.

According to a third aspect of the present invention, there is provided a second control device, comprising:

a database, that stores a network topology describing connection relationship among forwarding nodes including at least a forwarding node associated with an own second control device;

a processing rule generation unit that, based on forwarding path information received from a path transmission unit of a first control unit, refers to the network topology and generates a processing rule for a forwarding node(s) in a forwarding path of a received packet among forwarding node(s) associated with the own second control device; and a transmission unit that transmits the generated processing rule to the forwarding node on the forwarding path of the received packet, among forwarding nodes associated with the own second control device, wherein the processing rule is generated and transmitted to a forwarding node on a forwarding path, among forwarding nodes connected to the own second control device, based on the forwarding path information received from the first control device described above.

According to a fourth aspect of the present invention, there is provided a processing rule setting method, in a communication system comprising a plurality of control devices and a plurality of forwarding nodes each comprising a packet processing unit that performs processing of a received packet based on a processing rule set in advance or received from a control device associated with an own forwarding node, the processing rule setting method comprising:

by a first control device among the plurality of control devices, in response to a predetermined trigger, referring to correspondence between each of the plurality of forwarding nodes and each of the plurality of control devices, and transmitting, among forwarding path information, at least forwarding path information that includes a forwarding node associated with the own first control device, to a second control device associated with a forwarding node that is not associated with the first control device, among forwarding nodes on a forwarding path of the received packet; and by the second control device that receives the forwarding path information, generating a processing rule by referring to network topology describing connection among forwarding nodes including at least a forwarding node associated with the second control device and transmitting the processing rule to a forwarding node on a forwarding path of a received packet, among forwarding nodes associated with the own second control device. The present method is linked with specific apparatuses, referred to as a forwarding node and a control device, as described above.

According to a fifth aspect of the present invention, there is provided a program that is executed on a computer configuring the above mentioned first and second control devices. It is to be noted that this program can be recorded in a computer-readable storage medium. That is, the present invention can be embodied as a computer program product.

According to a sixth aspect of the present invention there is provided a communication system comprising a plurality of forwarding nodes and a plurality of control devices, wherein each of the plurality of forwarding nodes comprises a packet processing unit that performs processing of a received packet based on a processing rule set in advance or received from a control device associated with an own forwarding node;

each of the plurality of control devices comprises a correspondence management unit that stores correspondence between each of the plurality of forwarding nodes and each of the plurality of control devices;

when a received packet is forwarded from a certain forwarding node, a control device associated with a forwarding node on a forwarding path refers to the correspondence between each of the plurality of forwarding nodes and each of the plurality of control devices to transmit the received packet; and a control device associated with a forwarding node at an end of the forwarding path transmits the received packet to the forwarding node at the end, and instructs the forwarding node at the end to output the received packet from a specified port.

According to a seventh aspect of the present invention there is provided a communication method being a method of transmitting a packet in a communication system comprising a plurality of control devices, and a plurality of forwarding nodes each comprising a packet processing unit that performs processing of a received packet based on a processing rule set in advance or received from a control device associated with an own forwarding node, the communication method comprising:

by a control device associated with a forwarding node on a forwarding path, when a received packet is forwarded from a certain forwarding node, referring to a correspondence between each of the plurality of forwarding nodes and each of the plurality of control devices to transmit the received packet in turn, and by a control device associated with a forwarding node at an end of the forwarding path, transmitting the received packet to the forwarding node at the end, and instructing the forwarding node at the end to output the received packet from a specified port. The present method is linked with specific instruments, referred to as a forwarding node and a control device, as described above.

Effects of the Invention

According to the present invention, it is possible to ensure performance not less, than 'a predetermined level even in a case where a large number of (multiple) OpenFlow switches are present. A reason for this is that a configuration is used in which, in addition to using a plurality of control devices, processing is distributed over among the control devices.

BRIEF DESCRIPTION OF THE DRAWINGS

FIG. 7 is a table representing connection relationships of nodes and OpenFlow switches of FIG. 5;

FIG. 8 is a table representing correspondences between the OpenFlow switches and OpenFlow controllers of FIG. 5;

FIG. 10 is a diagram representing a configuration of a processing rule (flow entry) recorded in a flow table of an OpenFlow switch in the first exemplary embodiment of the present invention;

FIG. 11 is a specific example of a processing rule (flow entry) recorded in the flow table of the OpenFlow switch of FIG. 5;

FIG. 23 is a diagram showing an example of action names and action contents.

PREFERRED MODES

Figure 1:
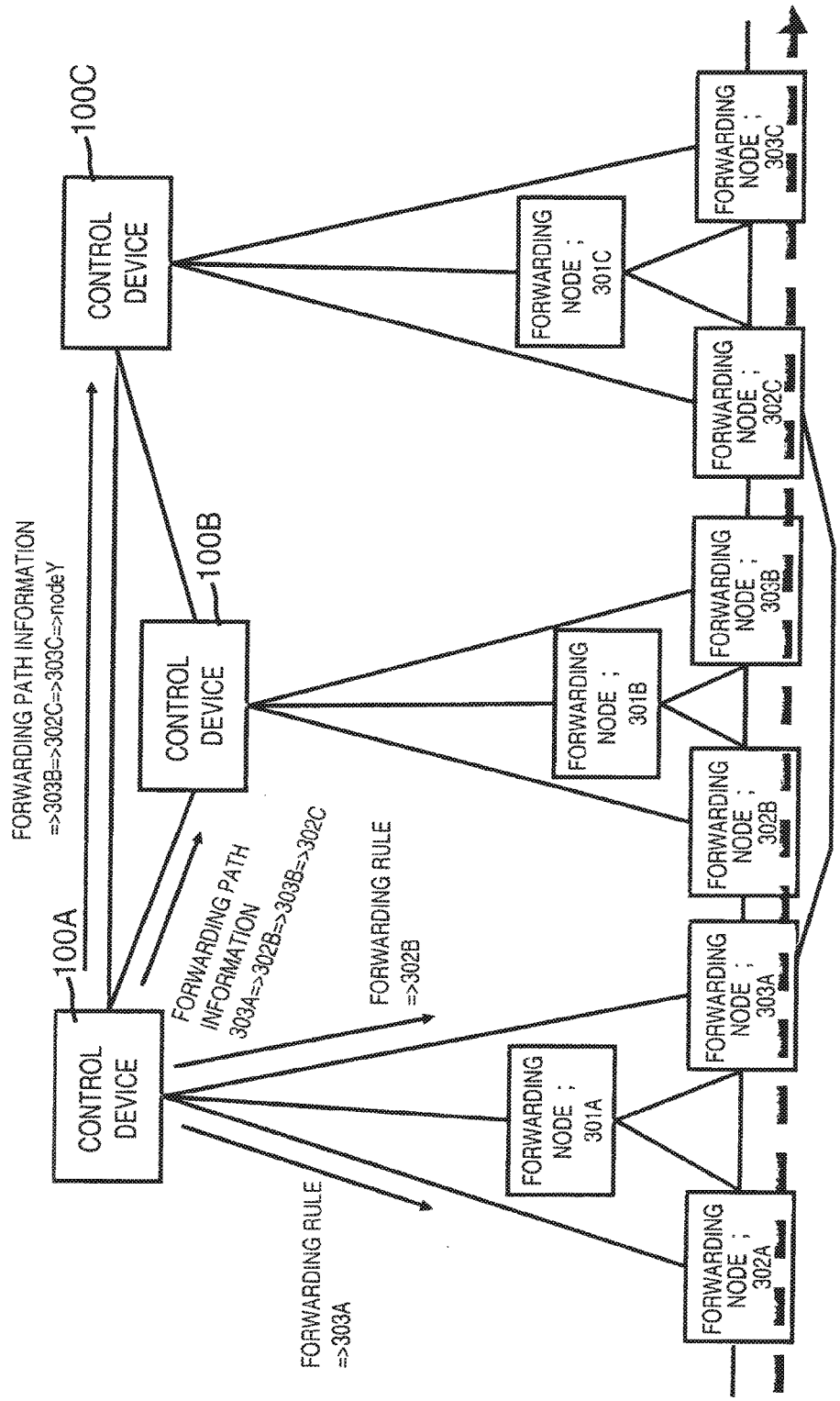
FIG. 1 is a diagram for describing an outline of the present invention.

First, a description is given concerning an outline of the present invention, making reference to FIG. 1 to FIG. 4. A communication system according to the present invention comprises, as shown in FIG. 1, a plurality of control devices 100A to 100C that generate and transmit, to forwarding node(s) on a calculated forwarding path, among forwarding nodes connected to each of the control devices, a processing rule determining a forwarding destination of a received packet, by referring to a network topology in which connection of the forwarding nodes are described, and a plurality of forwarding nodes 301A to 303A, 301B to 303B, and 301C to 303C, each of which is connected to any of the plurality of control devices 100A to 100C and comprises a packet processing unit that performs processing of a received packet based on a processing rule received from a control device associated with an own forwarding node. It is to be noted that reference symbols in the drawings noted in this outline are examples shown solely in order to assist understanding, and are not intended to limit the present invention to modes described in the drawings.

Figure 2:
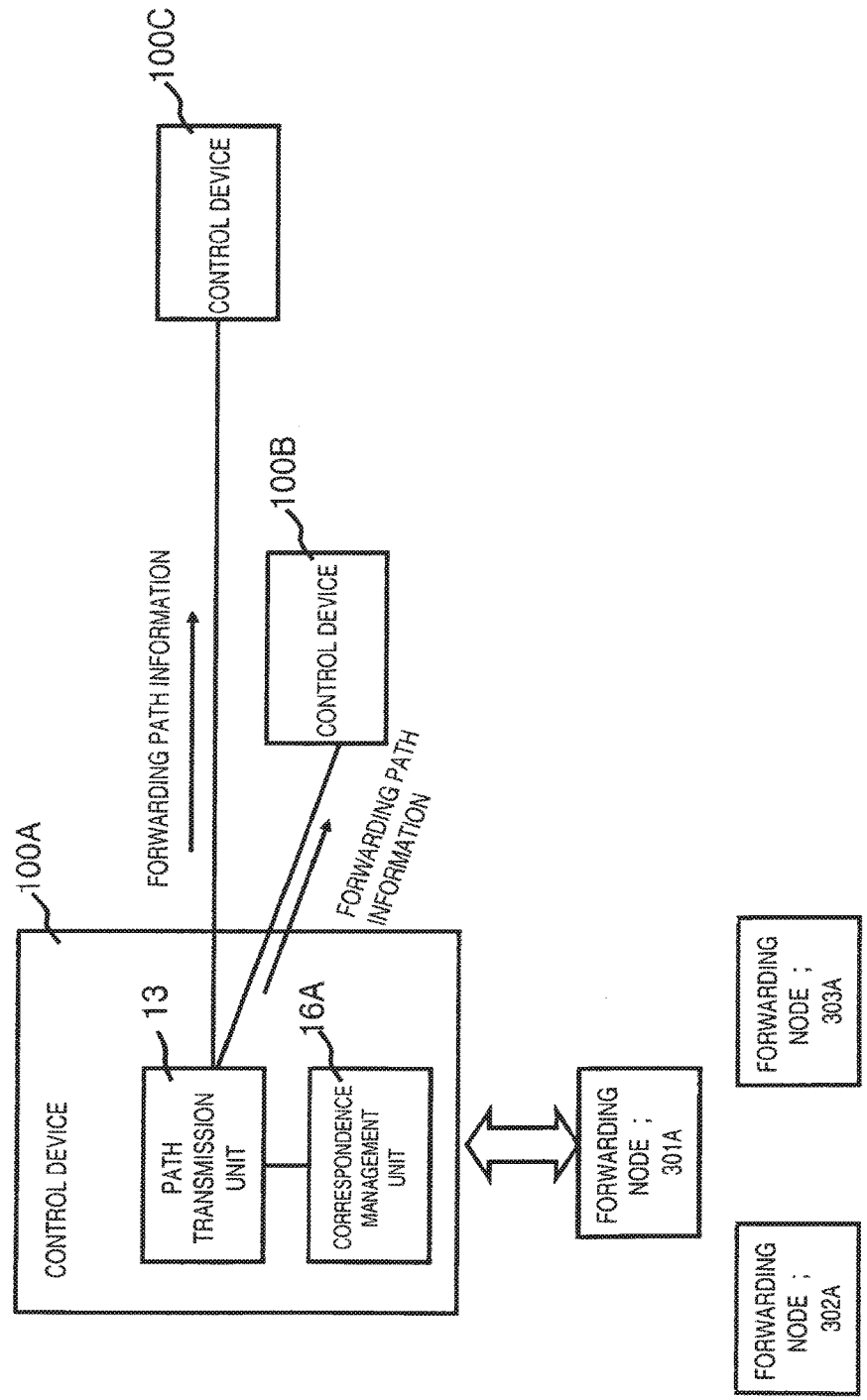
FIG. 2 is a diagram for describing an outline configuration of a control device (a first control device) of FIG. 1.

At least one of the plurality of control devices 100A to 100C (for example, control device 100A), as shown in FIG. 2, comprises an correspondence management unit 16A that stores correspondences between the forwarding nodes 301A to 303A, 301B to 303B, and 301C to 303C, and the control devices 100A to 100C, and a path transmission unit 13 that, in response to a predetermined trigger such as reception of a packet for which a processing rule is unknown from a forwarding node, refers to correspondence between each of the forwarding nodes and each of the control devices, and transmits, among forwarding path information, forwarding path information that includes at least a forwarding node associated with the at least own control device, to an other control device(s) (for example, a control device 100B or 100C) associated with a forwarding node that is/are not associated with the own control device, among forwarding nodes on a forwarding path of a received packet.

Figure 3:
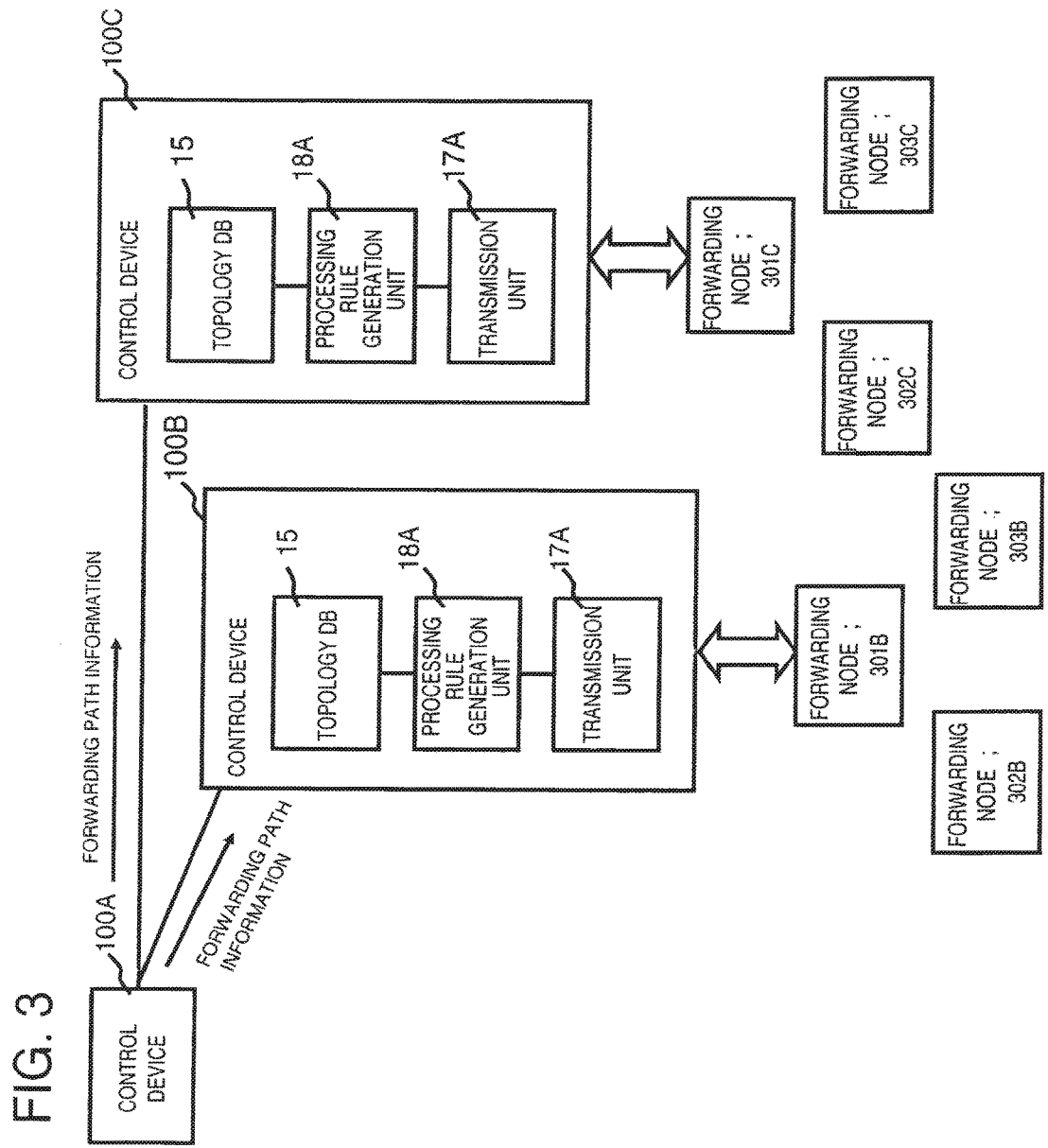
FIG. 3 is a diagram for describing an outline configuration of a control device (a second control device) of FIG. 1.

Among the plurality of control devices 100A to 100C, a control device that is on a receiving side of the forwarding path information (for example, a control device 100B or 100C), as shown in FIG. 3, comprises a database (topology DB) 15 that stores a network topology in which are described connection relationship among forwarding nodes including at least a forwarding node(s) associated with the own control device; a processing rule generation unit 18A that generates a processing rule by referring to a network topology, with regard to a forwarding node on a forwarding path of a received packet, among forwarding nodes associated with the control device, based on received forwarding path information; and a transmission unit 17A that transmits the generated processing rule to a forwarding node(s) in the forwarding path of the received packet, among forwarding nodes associated with the own control device.

Here, for example, the control device 100A, in response to a request from a certain client node connected to the forwarding node 302A, calculates a forwarding path in which a packet is forwarded via forwarding nodes 302A, 303A, 302B, 303B, 302C, and 303C, as shown by a broken line in FIG. 1. In this case, the control device 100A generates and transmits a processing rule implementing the forwarding path, for the forwarding nodes 302A and 303A that are connected to the own control device 100A. Furthermore, the control device 100A refers to a correspondence between each of the forwarding nodes and each of the control devices, and transmits forwarding path information for generating a processing rule, to the control devices 100B and 100C that are associated with the forwarding nodes 301B to 303B, and 301C to 303C that are not connected to the own control device 100A. The control devices 100B and 100C that received the forwarding path information generate and transmit the processing rule to the forwarding nodes 302B, 303B, 302C, and 303C on the forwarding path, among the forwarding nodes connected to the own control device(s) (100B, 100C), based on the forwarding path information.

From the above, the control devices 100B and 100C use a forwarding path received from the control device 100A, and by generating and transmitting a processing rule, a processing rule is set for all forwarding nodes in the forwarding path.

Figure 4:
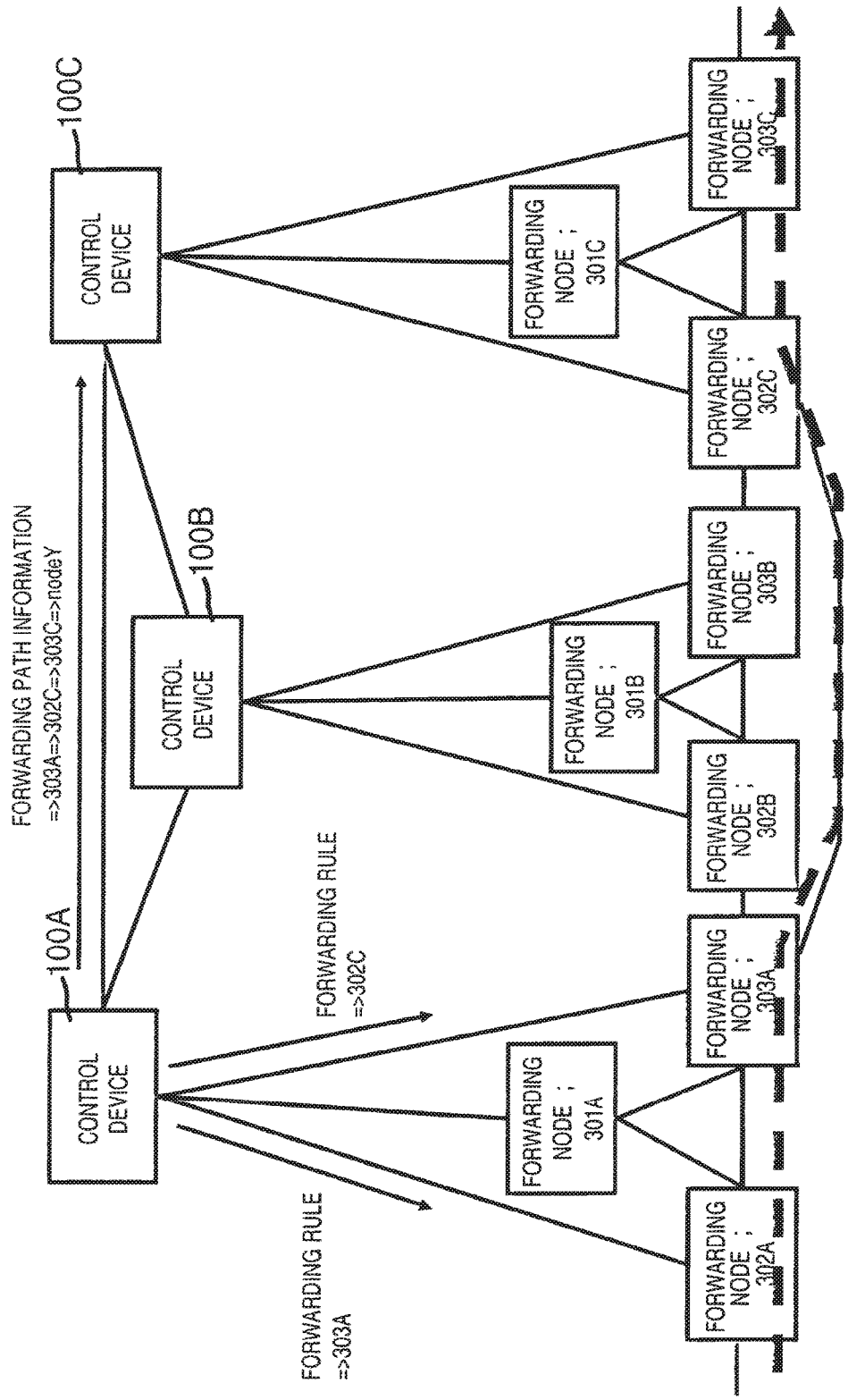
FIG. 4 is another diagram for describing an outline of the present invention.

Similarly, as shown in FIG. 4, assume that in response to a request from another client node, the control device 100A calculates a forwarding path for forwarding a packet via the forwarding nodes 302A, 303A, 302C, and 303C shown by a broken line in FIG. 4. In this case, the control device 100A generates and transmits a processing rule implementing the forwarding path, to the forwarding nodes 302A and 303A that are connected to the control device 100A. Furthermore, the control device 100A refers to correspondences between respective forwarding nodes and respective control devices, and transmits forwarding path information to the control device 100C that is associated with the forwarding nodes 301C to 303C that are not connected to the own control device 100A. The control device 100C that received the forwarding path information generates and transmits the processing rule to the forwarding nodes 302C and 303C in the forwarding path, among the forwarding nodes connected to the own control device 100C, based on the forwarding path information.

As described above, in a case where a forwarding path has been generated that does not pass through the control device 100B, transmission of the forwarding path information to the control device 100B is omitted. In this case, too, the control device 100C generates and transmits a processing rule, using the forwarding path received from the control device 100A whereby the processing rule is set for all forwarding nodes in the forwarding path.

The following modes are possible in the present invention.

(Mode 1)

The communication system according to the first aspect.

(Mode 2)

In the communication system, each of the plurality of control devices may further comprise:

a database that stores a network topology describing connection among forwarding nodes including at least a forwarding node associated with the own control device;

a processing rule generation unit that, based on forwarding path information received from the path transmission unit, refers to the network topology and generates the processing rule for a forwarding node in a forwarding path of a received packet among forwarding nodes associated with the own control device; and a transmission unit that transmits the generated processing rule to the forwarding node on the forwarding path of the received packet, among forwarding nodes associated with the own control device.

(Mode 3)

In the communication system, the first control device comprising the path transmission unit may further comprise:

a database that stores a network topology describing connection among forwarding nodes including at least a forwarding node associated with the own first control device; and a path calculation unit that, when receiving from a forwarding node connected to the first control device a request to transmit a processing rule concerning a new packet, refers to the network topology and calculates a forwarding path.

(Mode 4)

In the communication system, with the first control device comprising the path calculation unit as a start point, a control device associated with a forwarding node(s) on the forwarding path may forward the new packet independently of transmission processing of a processing rule, and a control device associated with a forwarding node at an end of the forwarding path may transmit the new packet to the forwarding node at the end, and instruct the forwarding node at the end to output the new packet from a specified port.

(Mode 5)

In the communication system, the forwarding path information may include a processing rule for transmission to a forwarding node that is not associated with the own first control device, and a second control device that received the forwarding path information may transmit a processing rule included in the forwarding path information to a forwarding node associated with the own second control device, among forwarding nodes on a forwarding path of a received packet.

(Mode 6)

In the communication system, the forwarding path may be a forwarding path calculated in advance for a combination of a start point node and an end point node that are arbitrarily selected.

(Mode 7)

In the communication system, the forwarding path may be cached for a predetermined time period, and calculation of a forwarding path may be omitted when a combination of an identical start point node and end point node is cached.

(Mode 8)

In the communication system, each of the plurality of control devices may comprise: the path transmission unit and a path calculation unit that, when receiving from a forwarding node connected to the own control device a request to transmit a processing rule concerning a new packet, refers to the network topology and calculates a forwarding path, the path transmission unit of a first control device may transmit, to a second control device associated with a forwarding node that received a packet from a forwarding node on the forwarding path, connected to the own first control device, the new packet and a start point for calculating a forwarding path for a forwarding node associated with the second control device, instead of the forwarding path information; and the second control device that received the start point and the new packet may recalculate a forwarding path based on the start point and the new packet, and generates and transmits a processing rule.

(Mode 9)

In the communication system, the control device may comprise a data synchronization unit that obtains information of a plurality of forwarding nodes connected to the own control device, and based on the obtained data updates at least one of connection relationship of each of the plurality of forwarding nodes, and correspondence between each of the plurality of forwarding nodes and each of the plurality of control devices.

(Mode 10)

The first control device according to the second aspect.

(Mode 11)

The second control device according to the third aspect.

(Mode 12)

The processing rule setting method according to the fourth aspect.

(Mode 13)

The program according to the fifth aspect.

(Mode 14)

The communication system according to the sixth aspect.

(Mode 15)

The communication method according to the seventh aspect.

It is to be noted that the first and second control devices, the processing rule setting method, the program, the communication system, and the communication method, as described in the abovementioned second to seventh aspects, similar to the communication system of Mode 1, can be expanded to the contents of Mode 2 to Mode 9, with regard to respective elements and steps.

First Exemplary Embodiment

Figure 5:
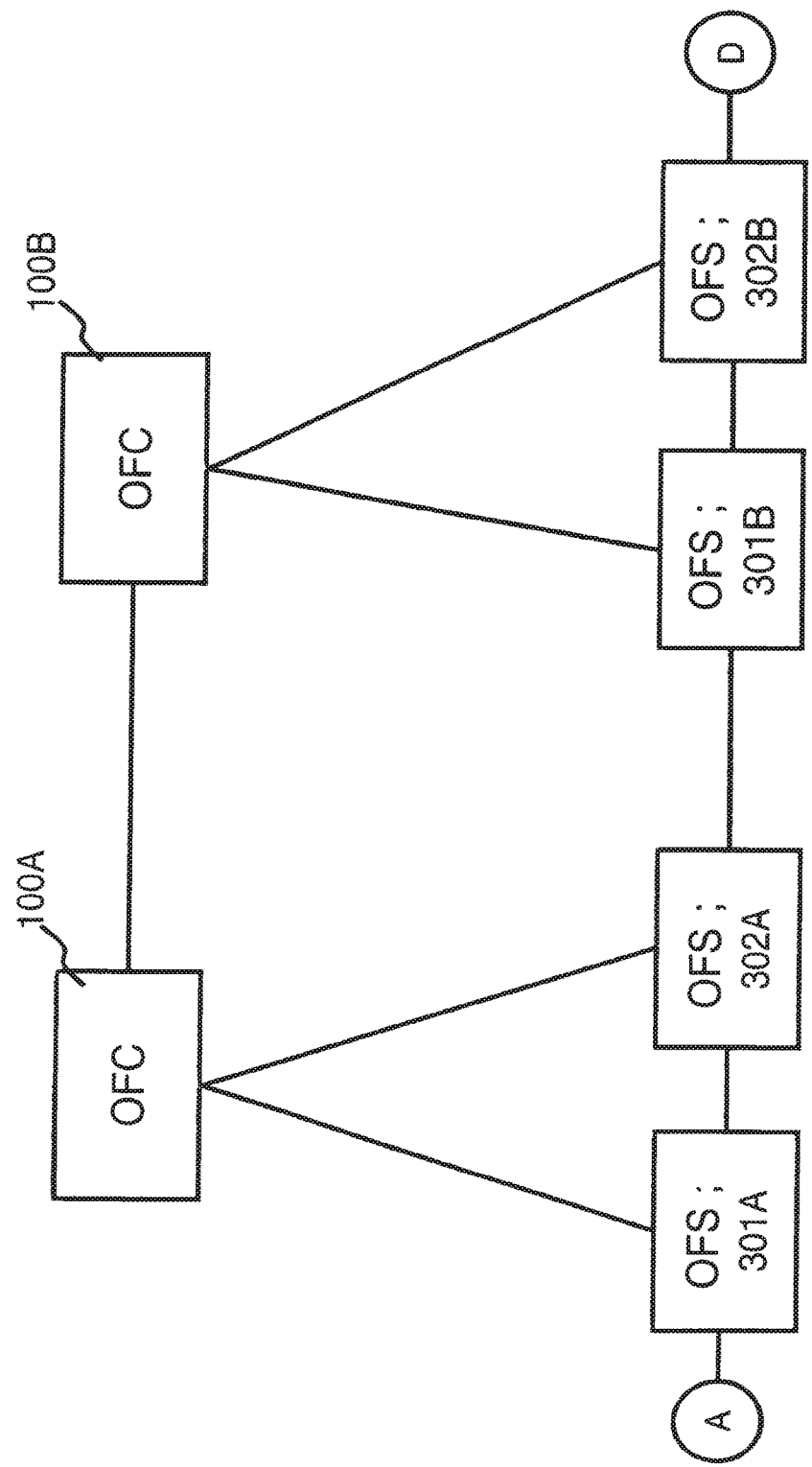
FIG. 5 is a diagram showing a configuration in a first exemplary embodiment of the present invention.

Next, a detailed description is given concerning a first exemplary embodiment of the present invention, making reference to the drawings FIG. 5 is a diagram showing a configuration of the first exemplary embodiment of the present invention. Referring to FIG. 5, four OpenFlow switches (referred to as OFSs below) 301A, 302A, 301B, and 302B, and OpenFlow controllers (referred to below as OFCs) 100A and 100B are shown. It is to be noted that in order to describe the present invention simply, the configuration of FIG. 5 is illustrative; there is no limitation to the number of OFSs or OFCs, and there is no necessity for the same number of OFSs to be connected to each of the respective OFCs. Furthermore, node A and node D are devices for transmitting and receiving a packet, such as a user terminal, various types of service server, or the like.

OFSs 301A, 302A, 301B, and 302B correspond to the forwarding nodes described above, hold flow entries (rule+action) set by OFCs 100A and 100B in respective flow tables, and execute actions of flow entries that have a rule matching a received packet.

Among the OFSs, the OFS 301A and 302A are connected to the OFC 100A, and operate according to a control from the OFC 100A. Similarly, among the OFSs, the OFSs 301B and 302B are connected to the OFC 100B, and operate according to a control from the OFC 100B. More specifically, in a case where a rule matching a received packet cannot be found in a flow table, the OFSs 301A and 302A request the OFC 100A to generate a forwarding path for the received packet and transmit (set) a flow entry (rule+action) for realizing the forwarding path. In the same way, in a case where a rule matching a received packet cannot be found in a flow table, the OFSs 301B and 302B request the OFC 100B to generate a forwarding path for the received packet and transmit (set) a flow entry (rule+action) for realizing the forwarding path. These types of OFS can be configured by adding functions described above to switches of respective vendors, as described in Non-Patent Documents 1 and 2.

The OFCs 100A and 100B correspond to the abovementioned control devices, and by transmitting (setting) flow entries (rule+action) to the OFSs 301A, 302A, 301B and 302B respectively connected thereto, control the later. Furthermore, the OFCs 100A and 100B of the present exemplary embodiment are connected, and as described later, forwarding path information generated by one thereof can be transmitted to the other.

Figure 6:
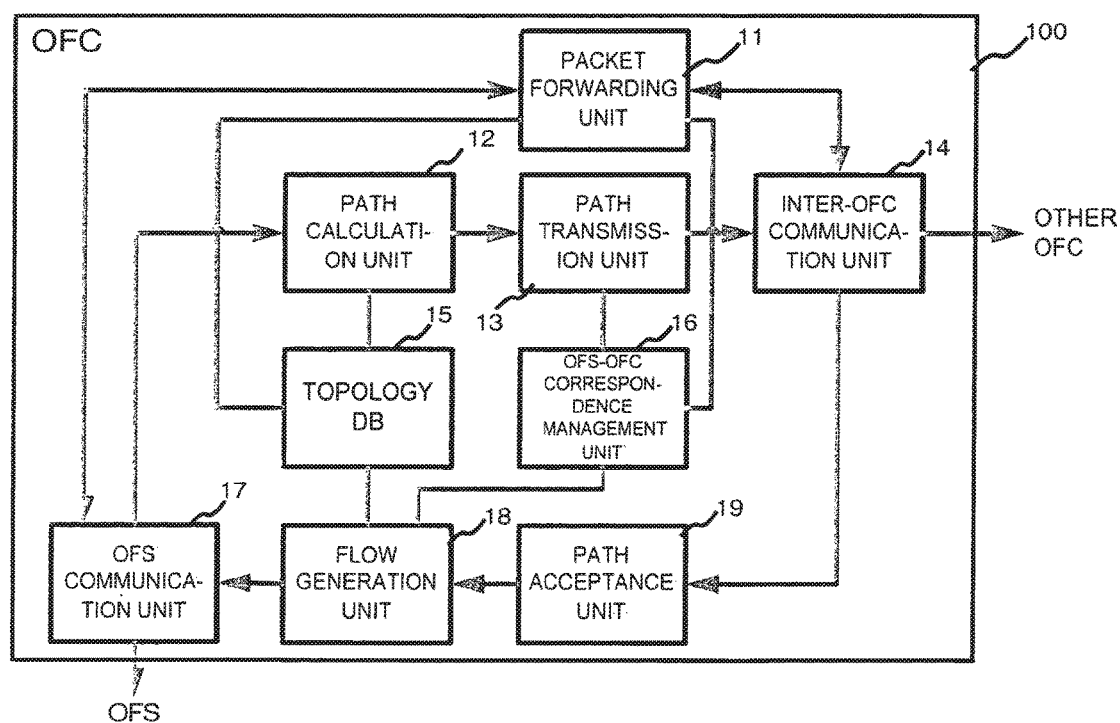
FIG. 6 is a diagram showing a configuration of an OpenFlow controller in the first exemplary embodiment of the present invention.

FIG. 6 is a diagram showing a configuration of an OFC of the first exemplary embodiment. Referring to FIG. 6, the OFC 100 comprises a packet forwarding unit 11, a path calculation unit 12, a path transmission unit 13, an inter-OFC communication unit 14, a topology DB 15, an OFS-OFC correspondence management unit 16, an OFS communication unit 17, a flow generation unit 18, and a path acceptance unit 19.

When there is no relevant flow entry in the OFS and a request for transmission (setting) of a processing rule (flow entry) is received, the packet forwarding unit 11 performs an operation of transmitting, to another OFC, a packet to which is attached a request for transmission (setting) of the processing rule (flow entry), via the inter-OFC communication unit 14.

Based on a switch ID of a source of the request for transmission (setting) of the processing rule (flow entry) and a packet outputted from the OFS communication unit 17, the path calculation unit 12 refers to the network topology describing connection between forwarding nodes recorded in the topology DB 15, and calculates a forwarding path in a sequential flow including the packet forwarded from the OFS. This path calculation can exploit, for example, Dijkstra's shortest path algorithm. Furthermore, in the path calculation, it is also possible to include consideration of traffic conditions in the network.

The path transmission unit 13 outputs a received packet and a forwarding path calculated in the path calculation unit 12, to the OFS-OFC correspondence management unit 16. Furthermore, the path transmission unit 13 refers to a correspondence between an OFS recorded in the OFS-OFC correspondence management unit 16 and an OFC connected to the OFS, and performs an operation of transmitting, via the inter-OFC communication unit 14, forwarding path information including the received packet and the forwarding path calculated in the path calculation unit 12, to an OFC (OFC associated with a certain OFS in the forwarding path) connected to a certain OFS in the forwarding path calculated in the path calculation unit 12. It is to be noted that, as the forwarding path information used here, as long as it is possible for the flow generation unit 18 of another OFC to generate a processing rule (flow entry), any format is possible, and, for example, content is possible in which another OFC makes a list of processing rules (flow entries) to be set in respective OFSs.

The inter-OFC communication unit 14 is connected to an inter-OFC communication unit 14 of an other OFC, and performs giving and receiving of forwarding path information and packets attached to requests for transmission (setting) of the flow entry in question as described above.

The topology DB (database) 15 records network topology describing connection relationships of nodes (various types of service server and external network) including OFSs. FIG. 7 describes connection relationship of nodes including the OFCs of FIG. 5 in a table format. In FIG. 7, "OFS; 302A" and the like, in actuality contain an IP address or MAC address of the OFS; 302A. It is to be noted that in the present exemplary embodiment, the OFCs 100A and 100B each hold the topology DB 15, but a configuration is also possible in which the OFC 100A and 100B share the topology DB15.

The OFS-OFC correspondence management unit 16 records correspondences between the OFS and the OFC connected to the OFS(s), and outputs a forwarding path and received packet outputted from the path transmission unit 13 and information of the OFS(s) connected to the OFC, to the flow generation unit 18. FIG. 8 describes connections between the OFSs and OFCs of FIG. 5 in a table format. It is to be noted that in the present exemplary embodiment, the OFS-OFC correspondence management unit 16 is provided independently of the topology DB 15, but it is also possible to merge the topology DB15 and the OFS-OFC correspondence management unit 16. For example, in addition to connections of the OFSs shown in FIG. 7, fields describing connected OFCs may be provided.

Since there is no flow entry corresponding to the received packet, the OFS communication unit 17 outputs a request for transmission (setting) of a flow entry together with the received packet transmitted from the OFS, to the path calculation unit 12. The OFS communication unit 17 transmits a processing rule (flow entry) generated in the flow generation unit 18 to a certain OFS in the forwarding path, among OFSs (OFSs associated with the OFC) connected to the OFC, and directs setting of a processing rule (flow entry).

The flow generation unit 18, based on the received packet and the forwarding path (information) and outputted from the OFS-OFC correspondence management unit 16 or the path acceptance unit 19, refers to the information of an OFS connected to the OFC and network topology of the topology DB 15, and generates a processing rule (flow entry) to be set in a certain OFS (an OFS associated with OFC) on the forwarding path, among OFSs connected to the OFC.

The path acceptance unit 19 outputs the forwarding path information including the received packet received from an other OFC to the flow generation unit 18, and performs an operation to generate the processing rule (flow entry).

It is to be noted that the abovementioned packet forwarding unit 11, the path calculation unit 12, the path transmission unit 13, the inter-OFC communication unit 14, the topology DB 15, the OFS-OFC correspondence management unit 16, the OFS communication unit 17, the flow generation unit 18, and the path acceptance unit 19 can be realized by a storage device or devices provided in a computer configuring the respective OFCs and a computer program using the storage device(s) as hardware.

Figure 9:
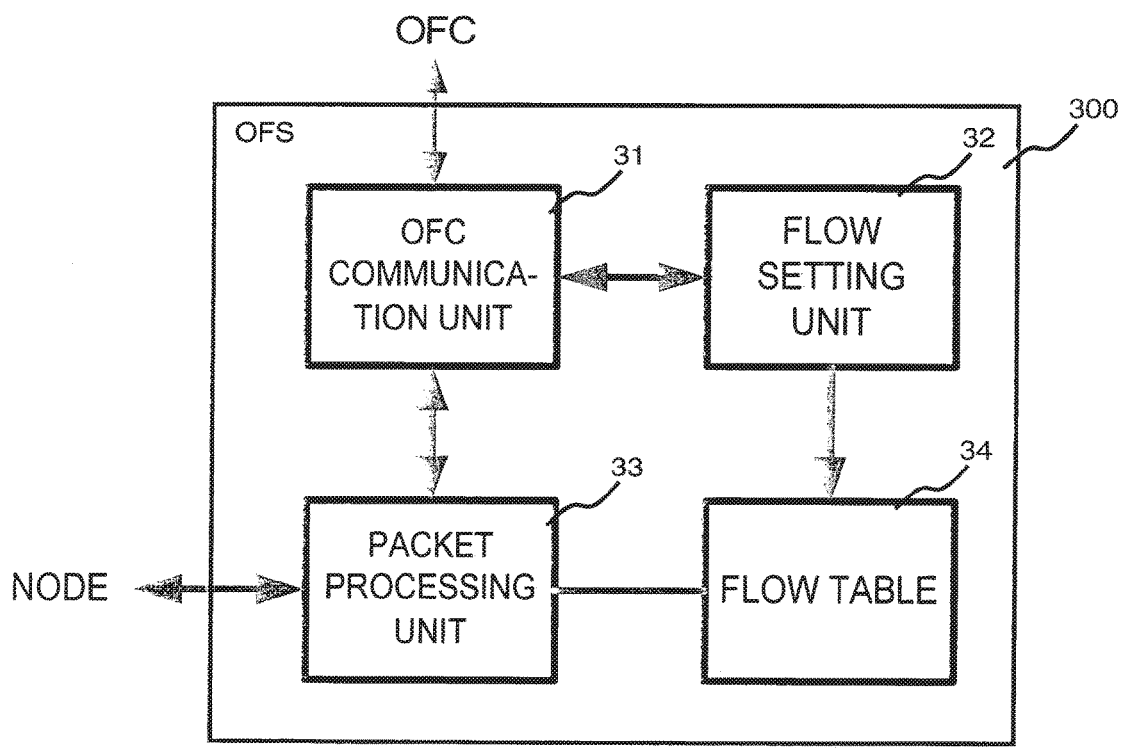
FIG. 9 is a diagram showing a configuration of an OpenFlow switch in the first exemplary embodiment of the present invention.

FIG. 9 is a diagram showing a configuration of an OFS of the first exemplary embodiment described above. Referring to FIG. 9, an OFS 300 comprises an OFC communication unit 31, a flow setting unit 32, a packet processing unit 33, and a flow table 34. Furthermore, in the OFS 300, an OFC to which the OFS 300 is connected (associated with the OFS 300) is set in advance.

The OFC communication unit 31 receives a processing rule (flow entry) from the OFS communication unit 17 of the OFC, and in addition to outputting to the flow setting unit 32, in a case where there is no flow entry corresponding to a received packet from the packet processing unit 33, requests the OFC to generate a processing rule (flow entry) for calculation of a forwarding path to be applied to the received packet and for realization of the forwarding path.

The flow setting unit 32 performs an operation to record or update the processing rule (flow entry) transmitted from the OFC via the OFC communication unit 31, in the flow table 34.

The packet processing unit 33 refers to the flow table 34, searches for a processing rule (flow entry) having a rule matching header information of the received packet received from a node including an other OFS, and executes processing content described in an Actions field of the processing rule (flow entry) matching the received packet.

The flow table 34 is a table containing processing rules (flow entries) transmitted from an OFC via the OFC communication unit 31. FIG. 10 is a diagram showing a field configuration of the flow table 34. For example, with regard to a flow having a characteristic such that an IP address of a node A is described in a source IP address field (IP SA), and an IP address of a node D is described in a destination IP address field (IP DA), by setting an action (OUTPUT in FIG. 23) that is forwarding from an interface (port) for transmission to an OFS following a forwarding path, among neighboring OFSs, forwarding according to a forwarding path of a flow from the node A to the node D is realized. Otherwise, by setting various types of action of FIG. 23, or having an Actions field empty, it is possible to change a MAC address or an IP address of a specific flow, or to drop a specific flow.

FIG. 11 is an example of a processing rule (flow entry) set in the OFSs 301A, 302A, 301B and 302B. Here, a forwarding path for forwarding a packet between node A and node D via the OFSs 301A, 302A, 301B and 302B is set. For example, an action for forwarding a packet from node A to node D as a destination in a forward direction (interface 2 (connected to OFS 302A; refer to FIG. 7)), and an action for forwarding a packet from node D to node A as a destination in a reverse direction (interface 1 (connected to node A; refer to FIG. 7)) are set in OFS 301A. In the same way, in OFSs 302A, 301B and 302B, by setting processing rules (flow entries) in a forward direction and a reverse direction, packet forwarding between node A and node D is performed in the above described forwarding path.

Figure 12:
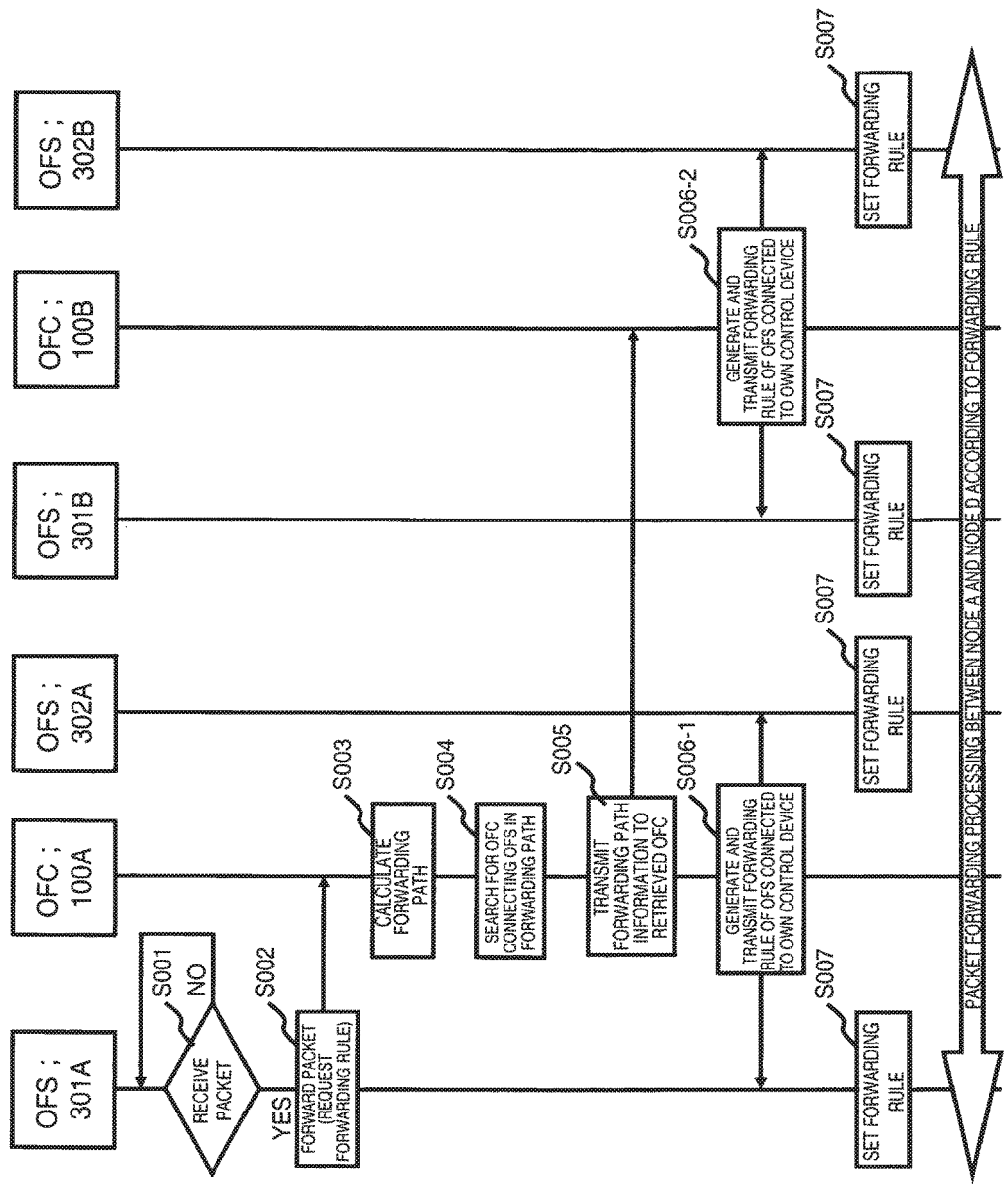
FIG. 12 is a sequence diagram illustrating an operation of the first exemplary embodiment of the present invention.

(Method of Setting a Processing Rule (Flow entry)) Next, a detailed description is given concerning an operation of the present exemplary embodiment, making reference to the drawings. FIG. 12 is a sequence diagram representing the operation of the present exemplary embodiment. In an example of FIG. 12, a packet (new packet) with a destination of node D that does not match any processing rule (flow entry) stored in the flow table 34 of the OFS 301A is transmitted from node A that is connected to the OFS 301A.

First, on receiving a new packet (step S001), the OFS 301A makes a request to the OFC 100A, which is connected to the OFS 301A, for transmission (setting) of a processing rule (flow entry) including the new packet (step S002). It is to be noted that in step S001, in a case of receiving a packet that matches a processing rule (flow entry) stored in the flow table 34 of the OFS 301A, the following processing is not performed, but packet forwarding processing according to a node processing rule is performed, as shown in the lowest portion of FIG. 12.

The OFC 100A, to which a request is made for transmission (setting) of the processing rule (flow entry), refers to the network topology of the topology DB 15, based on the OFS 301A that is a request source and node D that is a destination of the new packet, in the path calculation unit 12, to calculate a forwarding path in a sequential flow including the packet forwarded from the OFS 301A (step S003). Here, it is assumed that a forwarding path is calculated, in which a packet from node A with a destination of node D is forwarded in a sequence of OFS 301A, 302A, 301B and 302B.

Next, the OFC 100A refers to a correspondence between OFS and OFC, stored in the OFS-OFC correspondence management unit 16, and searches for an OFC associated with an OFS not connected to the OFC 100A, among OFSs in the calculated forwarding path (step S004). Here, the OFC 100B that is connected to the OFSs 301B and 302B which are not connected to the OFC 100A of FIG. 5, is retrieved.

Next, the OFC 100A transmits forwarding path information including the received packet and forwarding path calculated in step S003, to the retrieved OFC 100B.

Thereafter, the OFC 100A refers to the network topology of the topology DB 15 and information of the OFS connected to the own OFC 100A, generates a processing rule (flow entry) to be set in an OFS in the forwarding path, among OFSs connected to the OFC 100A, and performs transmission (setting) with respect to the OFSs 301A and 302A (step S006-1).

In the same way, the OFC 100B also refers to the network topology of the topology DB 15 and information of the OFS connected to the own OFC 100B, generates a processing rule (flow entry) to be set in an OFS in the forwarding path, among OFSs connected to the own OFC 100B, and performs transmission (setting) with respect to the OFSs 301B and 302B (step S006-2).

Thereafter, in each of the OFSs 301A, 302A, 301B and 302B, processing is performed to record or update the received processing rule (flow entry) in the flow table 34 (step S007).

From the above, in each of the OFSs 301A, 302A, 301B and 302B, a processing rule corresponding to the calculated forwarding path is set (refer to FIG. 11), and packet forwarding between node A and node B becomes possible.

It is to be noted that in the abovementioned steps S006-1 and S006-2, the OFC performs transmission (setting) of a processing rule (flow entry) at the same time in an OFS in the forwarding path, among OFSs connected to the own OFC, but among these, an arrangement is possible in which transmission (setting) of the processing rule (flow entry) in a portion of the OFSs among these is performed, (for example, an OFS or OFSs on an upstream side of the forwarding path). In this case, each OFC performs transmission (setting) of a processing rule (flow entry) after receiving a request for transmission (setting) of a processing rule (flow entry) from respective OFSs.

Figure 13:
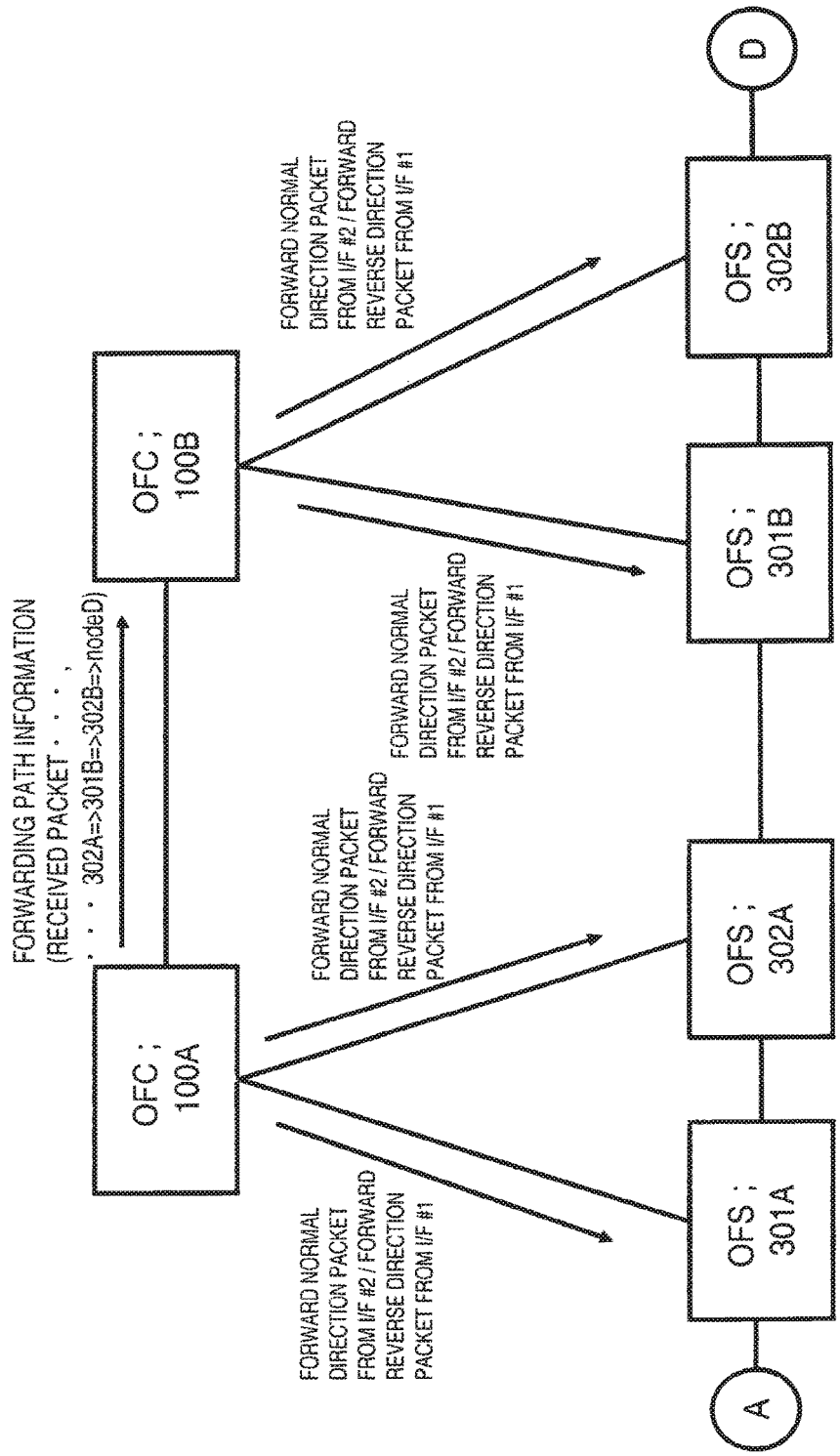
FIG. 13 is a diagram in which an operation according to a sequence of FIG. 12 is recorded in FIG. 5.

FIG. 13 is a diagram in which an operation according to a sequence of FIG. 12 is recorded in a configuration diagram of FIG. 5. With receipt of a request for transmission (setting) of a processing rule of a certain packet as a trigger from the OFS 301A, the OFC 100A performs calculation of the forwarding path, and sets a result thereof as a processing rule (flow entry) with respect to the OFSs 301A and 302A. Furthermore, by the OFC 100A transmitting forwarding path information to the OFC 100B, setting of a processing rule (flow entry) for the OFSs 301B and 302B is performed. As is clear also from FIG. 13, in the present invention, the number of OFS/OFC is not particularly limited, and in a case where an other OFS is present in the forwarding path, it is possible to transmit the forwarding path information to an OFC concerned connected to the OFS, and to set a processing rule (flow entry).

Furthermore, both OFCs 100A and 100B of FIG. 13 do not need to be provided with the path calculation unit 12 and the path acceptance unit 19; for example, a configuration can be used in which, if the OFC 100A receives a new packet, the path calculation unit 12 is disposed in the OFC 100A and the path acceptance unit 19 is disposed in the OFC 100B.

(Bypass Transfer of New Packet)

Figure 14:
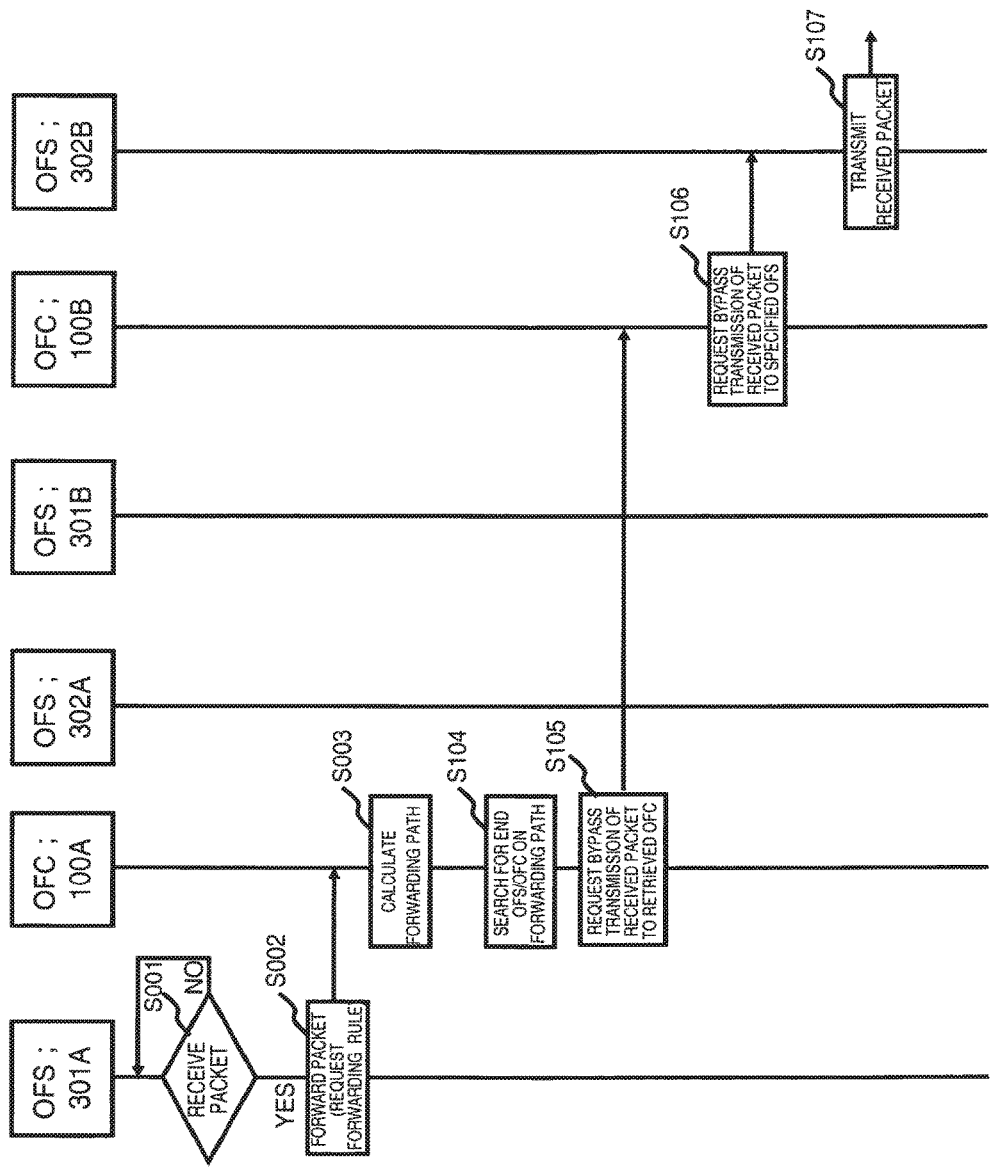
FIG. 14 is a second sequence diagram representing an operation of the first exemplary embodiment of the present invention.

Next, a description is given concerning a bypass forwarding method of a new packet performed in parallel, independent of the abovementioned processing rule (flow entry). FIG. 14 is a sequence diagram representing flow of bypass forwarding of a new packet in the present exemplary embodiment. Since the flow of steps S001 to S003 of FIG. 14 is the same as steps S001 to S003 of FIG. 12, a description is given below concerning sequential flow performed after forwarding path calculation.

Referring to FIG. 14, the OFC 100A that has calculated a forwarding path searches for an OFS (an OFS located at the end of the forwarding path) that is connected to a destination node on the calculated forwarding path, then refers to correspondences between OFS and OFC, stored in the OFS-OFC correspondence management unit 16, and retrieves an OFC associated with the OFS concerned (step S104). Here, a forwarding path is calculated in which a packet from node A to a destination of node D is forwarded in a sequence of OFS 301A, 302A, 301B and 302B. At this time, the OFS at the end of the forwarding path is the OFS 302B, and the OFC 100B connected to the OFS 302B is retrieved.

Next, the OFC 100A transmits a new packet received in step S001, to the retrieved OFC 100B, and requests a transmission from a specified interface of the subordinate OFS 302B (step S105).

The OFC 100B requests the subordinate OFS 302B to transmit the new packet from a specified interface (step S106).

The OFS 302B transmits the new packet from the specified interface in accordance with an instruction from the OFC 100B (step S107). Various methods can be considered as an arrangement in which the OFS 302B transmits the new packet to a specified interface; a processing rule (flow entry) for outputting a packet having specified header information from a specified interface may be stored in each OFS, and processing for writing the header information in a new packet may be performed by the OFC 100B.

Figure 15:
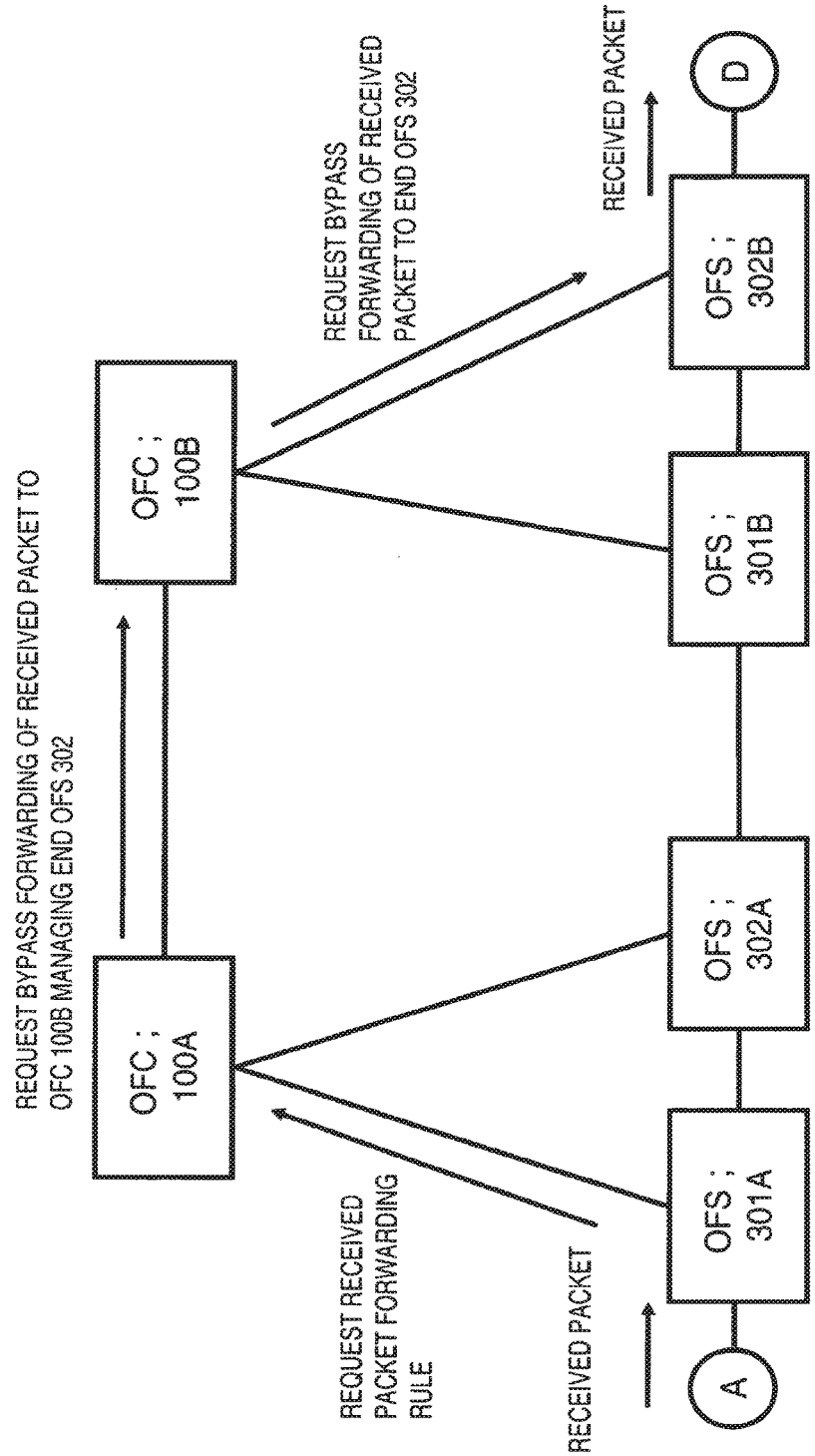
FIG. 15 is a diagram in which an operation according to a sequence of FIG. 14 is recorded in FIG. 5.

From the above, it is possible to have bypass forwarding of a packet, where, with calculation of a forwarding path as a trigger, a packet (new packet) is forwarded via an OFC, without going through an OFS on the way, and is outputted from the end. It is to be noted that the abovementioned procedure sequence, as shown in FIG. 15, can be performed independently from transmission (setting) of the processing rule (flow entry), and there is an effect of being able to transmit a new packet to a destination node without waiting for setting of the processing rule (flow entry) by the unit. However, this may be performed in parallel to transmission (setting) of the processing rule (flow entry) shown in FIG. 13. For example, it is possible to insert processing of steps S104 and S105 of FIG. 14 before or after processing of steps S004 to S006-1 of FIG. 12, to perform execution in OFC 100A.

As is clear from FIG. 15, in the present invention, the number of OFS/OFC is not particularly limited and it is possible to transmit a packet without going through an OFS along the forwarding path.

A description has been given above of a first exemplary embodiment of the present invention by showing an example of a forwarding (i.e., normal) path in which a packet from node A to a destination of node D is forwarded in the sequence of OFSs 301A, 302A, 301B and 302B (termed as "normal direction"). However, the forwarding path is not limited to the above description. For example, in a case of calculation of a forwarding path for forwarding a packet to a node connected to OFS 302B from OFS 301A, via OFSs 302A and 302B, operation is approximately the same as the above description. In addition, for example, in a case of calculation of a forwarding path for forwarding a packet to a node A, from the OFS 302B, via OFSs 301B, 302A and 301A also, by only switching the OFC 100B and the OFC 100A operation is approximately the same as the above description.

Second Exemplary Embodiments

Next, a detailed description is given concerning a second exemplary embodiment of the present invention, in which a modification has been added to an OFC described above, making reference to the drawings. In the present exemplary embodiment, since only an OFC configuration is different from the first exemplary embodiment, the description below is centered on points of difference thereof.

Figure 16:
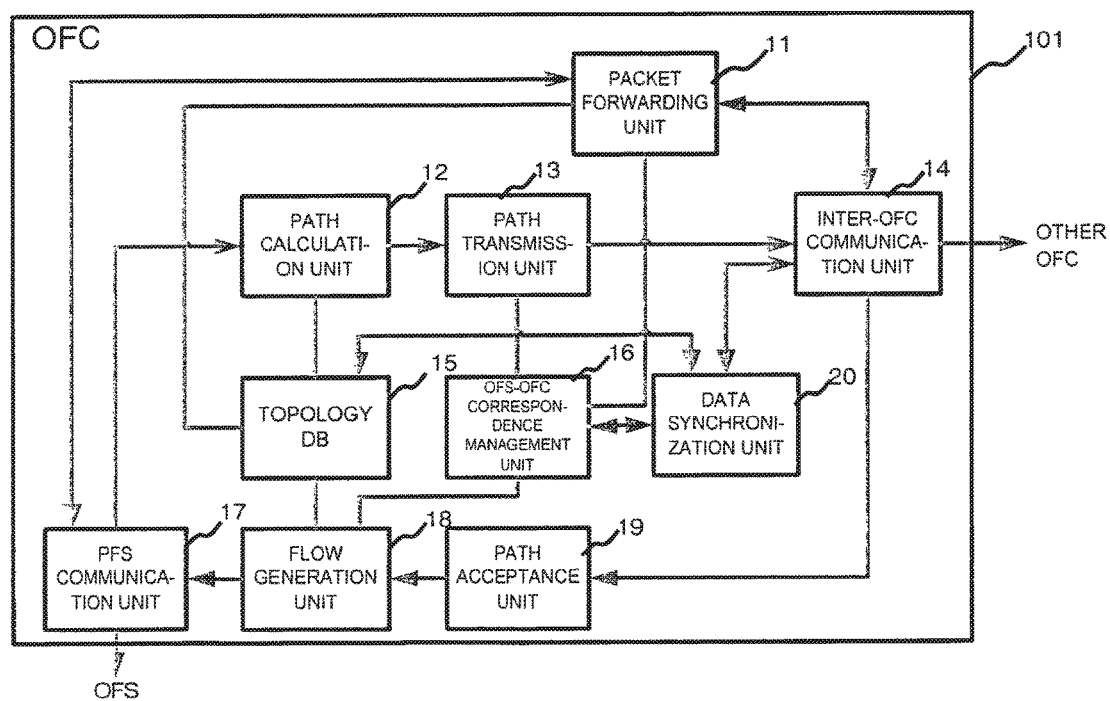
FIG. 16 is a diagram showing a configuration of an OpenFlow controller in a second exemplary embodiment of the present invention.

FIG. 16 is a diagram showing a configuration of the OFC 101 of the second exemplary embodiment of the present invention. A point of difference from the OFC 100 of the first exemplary embodiment shown in FIG. 6 is the addition of a data synchronization unit 20 for obtaining information of nodes connected to the OFC 100.

The data synchronization unit 20, specifically, collects information of devices and configurations thereof coming from various nodes on a network using LLDP (Link Layer Discovery Protocol) or various types of vendor protocol, acquires physical connections between nodes, and performs an operation to reflect results thereof in a topology DB 15 or OFS-OFC correspondence management unit 16. In addition, it is possible to use a configuration in which the data synchronization unit 20 is not installed in all OFCs, but a data synchronization unit 20 of a certain OFC updates a topology DB 15 and an OFS-OFC correspondence management unit 16 of an other OFC, via an inter-OFC communication unit 14.

As described above, according to the present exemplary embodiment that uses the OFC provided with the data synchronization unit 20, in a case where a modification is added to a network configuration or a case where a failure of respective nodes occurs, it is possible to generate an appropriate forwarding path and to perform distribution of processing rules (flow entries) based on the forwarding path.

Third Exemplary Embodiments

Next, a detailed description is given concerning a third exemplary embodiment of the present invention in which a modification has been added to the OFC described above, making reference to the drawings. In the present exemplary embodiment a cache function of a forwarding path is added to an OFC of the first exemplary embodiment, and a description below is centered on points of difference thereof.

Figure 17:
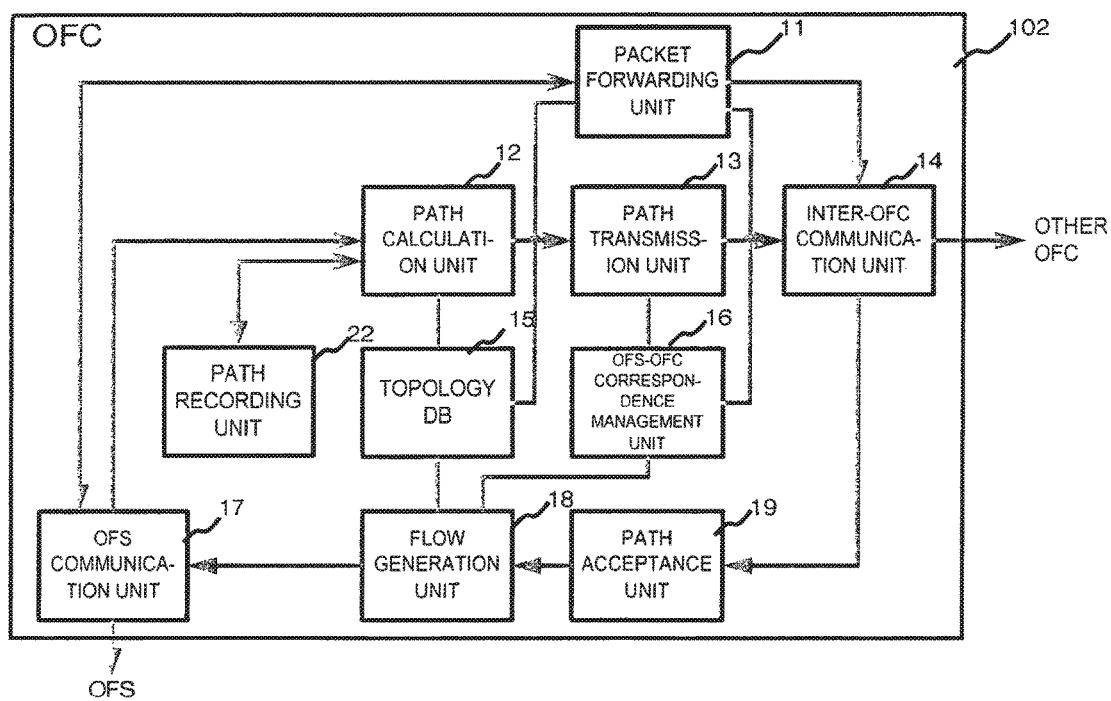
FIG. 17 is a diagram showing a configuration of an OpenFlow controller in a third exemplary embodiment of the present invention.

FIG. 17 is a diagram showing a configuration of the OFC 102 of the third exemplary embodiment of the present invention. A point of difference from the OFC 100 of the first exemplary embodiment shown in FIG. 6 is the addition of a path recording unit 22 to the path calculation unit 12.

The path recording unit 22 is used in order to record a forwarding path calculated in a path calculation unit 12 until a predetermined timing has been reached.

(Method of Setting a Cache Processing Rule (Flow Entry))

Figure 18:
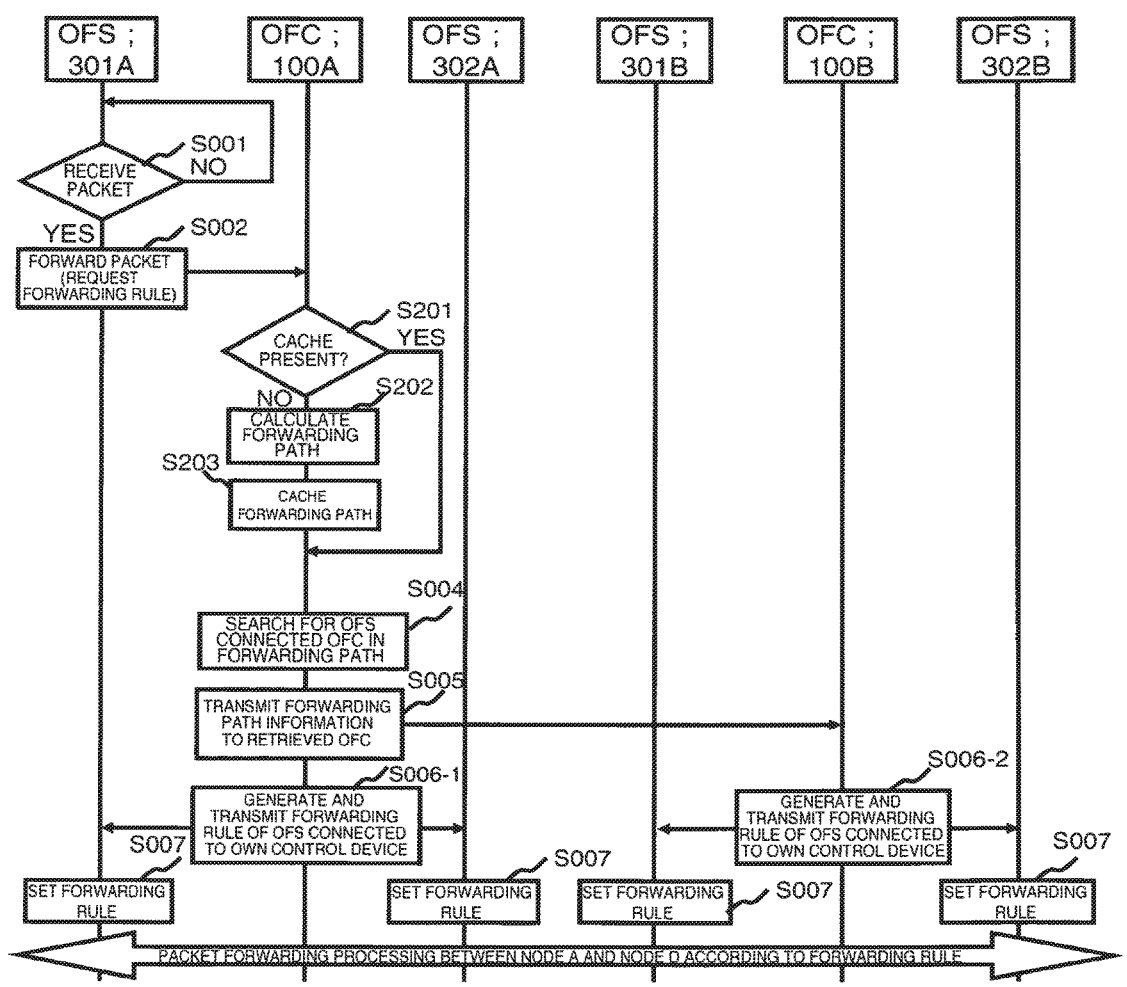
FIG. 18 is a sequence diagram illustrating an operation of the third exemplary embodiment of the present invention.

Next, a detailed description is given concerning an operation of the present exemplary embodiment, making reference to the drawings. FIG. 18 is a sequence diagram representing the operation of the present exemplary embodiment. In an example of FIG. 18, a packet (new packet) with a destination of node D that does not match any processing rule (flow entry) stored in a flow table 34 of an OFS 301A is transmitted from node A that is connected to the OFS 301A.

Operation as far as where the OFS 301A receives a new packet (step S001) and requests an OFC 100A, which is connected to the own OFS 301A, to transmit (set) a processing rule (flow entry) including the new packet (step S002) is the same as in the first exemplary embodiment. It is to be noted that also in the present exemplary embodiment, in step S001, in a case of receiving a packet that matches a processing rule (flow entry) stored in the flow table 34 of the OFS 301A, the following processing is not performed but packet forwarding processing according to a node processing rule is performed, as shown in the lowest portion of FIG. 18.

Before calculating a forwarding path in the path calculation unit 12, the OFC 100A, to which a request is made for transmission (setting) of the processing rule (flow entry), refers to the path recording unit 22, and searches forwarding path information having a characteristic that is the same as the new packet (for example, a packet having a destination of node D, from the OFS 301A) (step S201).

As a result of the search, in a case of finding forwarding path information having a characteristic that is the same as the new packet (for example, a packet having a destination of node D, from the OFS 301A), the OFC 100A omits calculation of the forwarding path and performs operation of step S004 and following.

On the other hand, as a result of the search, in a case of not finding forwarding path information having a characteristic that is the same as the new packet (for example, a packet having a destination of node D, from the OFS 301A), the OFC 100A, based on node D that is the destination of the new packet and the OFS 301A that is the origin of the request, refers to network topology of the topology DB 15 and calculates a forwarding path in a sequential flow including the packet forwarded from the OFS 301A (step S202). After that, the OFC 100A stores the calculated forwarding path together with a characteristic of the new packet in the path recording unit 22 (step S203).

Subsequent operations are the same as in the first exemplary embodiment described above. According to the present exemplary embodiment, with regard to a packet for which a forwarding path is generated, as long as content thereof is stored in the path recording unit 22, since generating a forwarding path can be omitted, it is possible to reduce OFC load and to improve responsiveness as far as transmitting (setting) a processing rule (flow entry).

Furthermore, in the present exemplary embodiment, it is also possible to execute a bypass forwarding procedure for a new packet shown in FIG. 14 in parallel. In this case also, it is possible to insert processing of steps S104 and S105 of FIG. 14 before or after processing of steps S004 to S006-1 of FIG. 18, to perform execution in OFC 100A.

Fourth Exemplary Embodiment

Next, a detailed description is given concerning a fourth exemplary embodiment of the present invention in which a modification has been added to an OFC described above, making reference to the drawings. In the present exemplary embodiment a forwarding path cache function and a speculative path calculation function are added to the OFC of the first exemplary embodiment, and a description below is centered on points of difference thereof.

Figure 19:
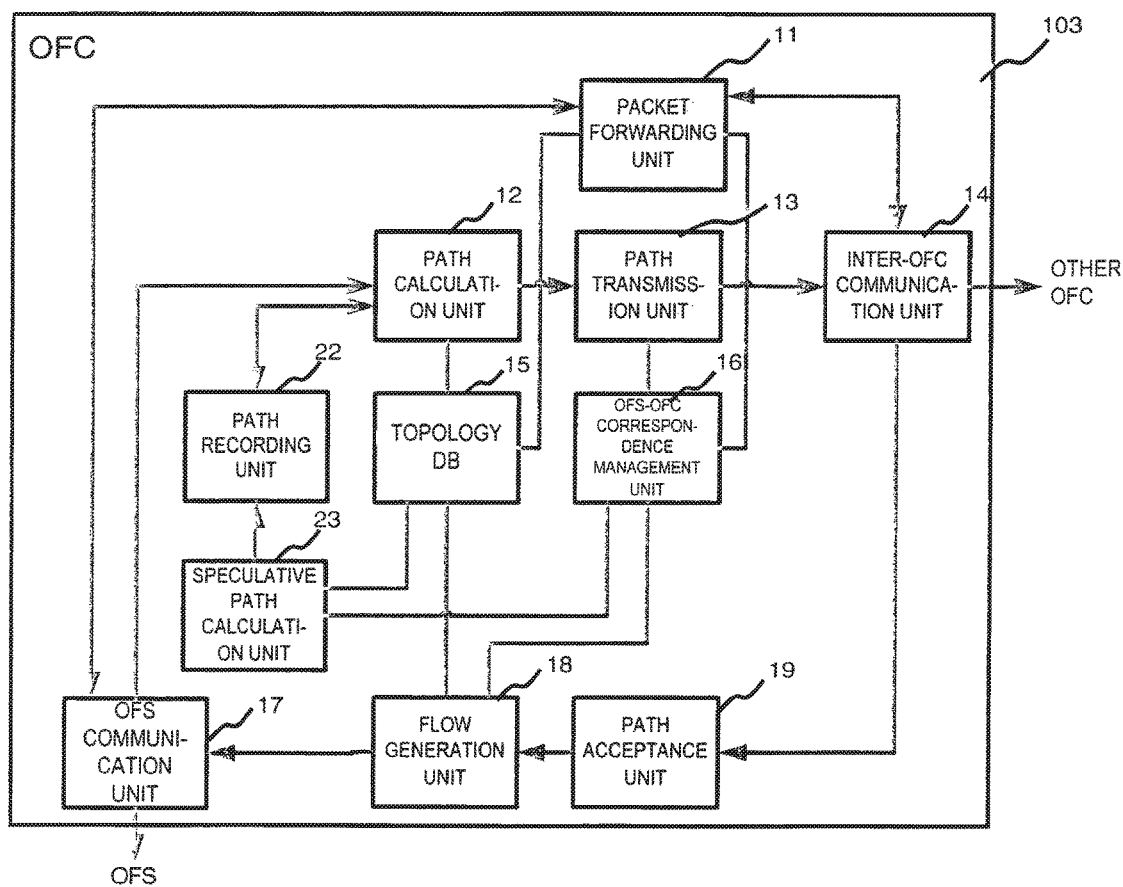
FIG. 19 is a diagram showing a configuration of an OpenFlow controller in a fourth exemplary embodiment of the present invention.

FIG. 19 is a diagram showing a configuration of an OFC 103 of the fourth exemplary embodiment of the present invention. Points of difference from the OFC 100 of the first exemplary embodiment shown in FIG. 6 are the addition of a path recording unit 22 to the path calculation unit 12, and the addition of a speculative path calculation unit 23 that generates and stores a forwarding path in the path recording unit 22.

The path recording unit 22 is used in order to store a forwarding path calculated in the path calculation unit 12 until a predetermined timing has been reached.

When an OFC is first started up or when load is low, when a change occurs in a network topology, or at a predetermined timing such as at a fixed time interval or the like, the speculative path calculation unit 23 refers to a topology DB 15, calculates a forwarding path from a certain OFS to a certain node, and records in the path recording unit 22. Here, "speculative" means not waiting for a transmission (setting) request regarding a processing rule (flow entry), but preemptively generating a processing rule (flow entry).

It is to be noted that as a combination of a node and an OFS for which the speculative path calculation unit 23 calculates the forwarding path, it is desirable to make a selection that is not stored in the path storing unit 22. By this type of arrangement, it is possible to curtail generation of a cache miss when a request for transmission (setting) of a processing rule (flow entry) is generated.

(Method of Setting Processing Rule (Flow Entry) Using Speculative Transfer Path)

Figure 20:
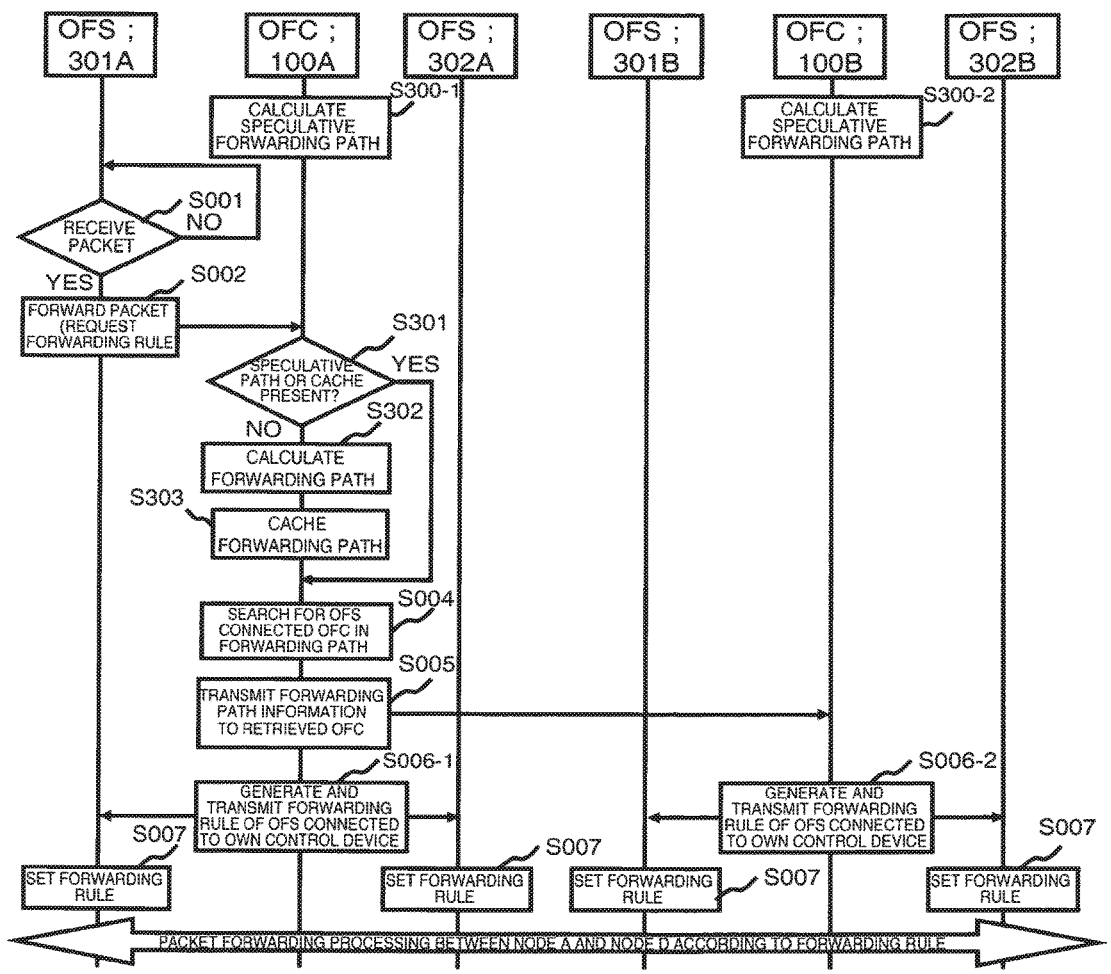
FIG. 20 is a sequence diagram illustrating an operation of the fourth exemplary embodiment of the present invention.

Next, a detailed description is given concerning an operation of the present exemplary embodiment, making reference to the drawings. FIG. 20 is a sequence diagram representing the operation of the present exemplary embodiment. In an example of FIG. 20, a packet (new packet) with a destination of node D that does not match any processing rule (flow entry) stored in a flow table 34 of an OFS 301A is transmitted from node A that is connected to the OFS 301A.

First, when an OFC is first started up or when load is low, when a change occurs in a network topology, or at a predetermined timing such as at a fixed time interval or the like, the speculative path calculation unit 23 of OFCs 100A and 100B performs calculation of a speculative forwarding path (steps S300-1 and S300-2).

Operation as far as where the OFS 301A receives a new packet (step S001) and requests the OFC 100A, which is connected to the OFS 301A, to transmit (set) a processing rule (flow entry) including the new packet (step S002), is the same as in the first exemplary embodiment. It is to be noted that in the present exemplary embodiment, in step S001, in a case of receiving a packet that matches a processing rule (flow entry) stored in the flow table 34 of the OFS 301A, the following processing is not performed but packet forwarding processing according to a node processing rule is performed, as shown in the lowest portion of FIG. 20.

Before calculating a forwarding path in the path calculation unit 12, the OFC 100A, to which a request is made for transmission (setting) of the processing rule (flow entry), refers to the path recording unit 22, and searches forwarding path information having a characteristic that is the same as the new packet (for example, a packet having a destination of node D, from the OFS 301A) (step S301).

As a result of the search, in a case of finding forwarding path information having a characteristic that is the same as the new packet (for example, a packet having a destination of node D, from the OFS 301A), the OFC 100A omits calculation of the forwarding path to perform operation of step S004 and following.

On the other hand, as a result of the search, in a case of not finding forwarding path information having a characteristic that is the same as the new packet (for example, a packet having a destination of node D, from the OFS 301A), the OFC 100A, based on node D that is the destination of the new packet and the OFS 301A that is the origin of the request, refers to network topology of the topology DB 15 and calculates a forwarding path in a sequential flow including the packet transmitted from the OFS 301A (step S302). After that, the OFC 100A stores the calculated forwarding path together with a characteristic of the new packet in the path recording unit 22 (step S303).

Subsequent operations are the same as in the first exemplary embodiment described above. According to the present exemplary embodiment, with regard to a packet for which a forwarding path was generated and a forwarding path calculated in a statistical path calculation unit, as long as contents thereof are stored in the path recording unit 22, since it is possible to omit generating a forwarding path, a response up to reducing OFC load and transmission (setting) of a processing rule (flow entry) can be improved.

Furthermore, in the present exemplary embodiment it is also possible to execute a bypass forwarding procedure for a new packet shown in FIG. 14 in parallel. In this case also, it is possible to insert processing of steps S104 and S105 of FIG. 14 before or after processing of steps S004 to S006-1 of FIG. 18, to perform execution in the OFC 100A.

Fifth Exemplary Embodiment

Next, a detailed description is given, making reference to the drawings, concerning a fifth exemplary embodiment of the present invention, in which OFCs as described above do not carry out an exchange of forwarding path information between themselves, and calculation of forwarding path is distributed among the respective OFCs. Since the present exemplary embodiment can be realized by a configuration equivalent to an OFC of the first exemplary embodiment, the description below is centered on points of difference thereof.

Figure 21:
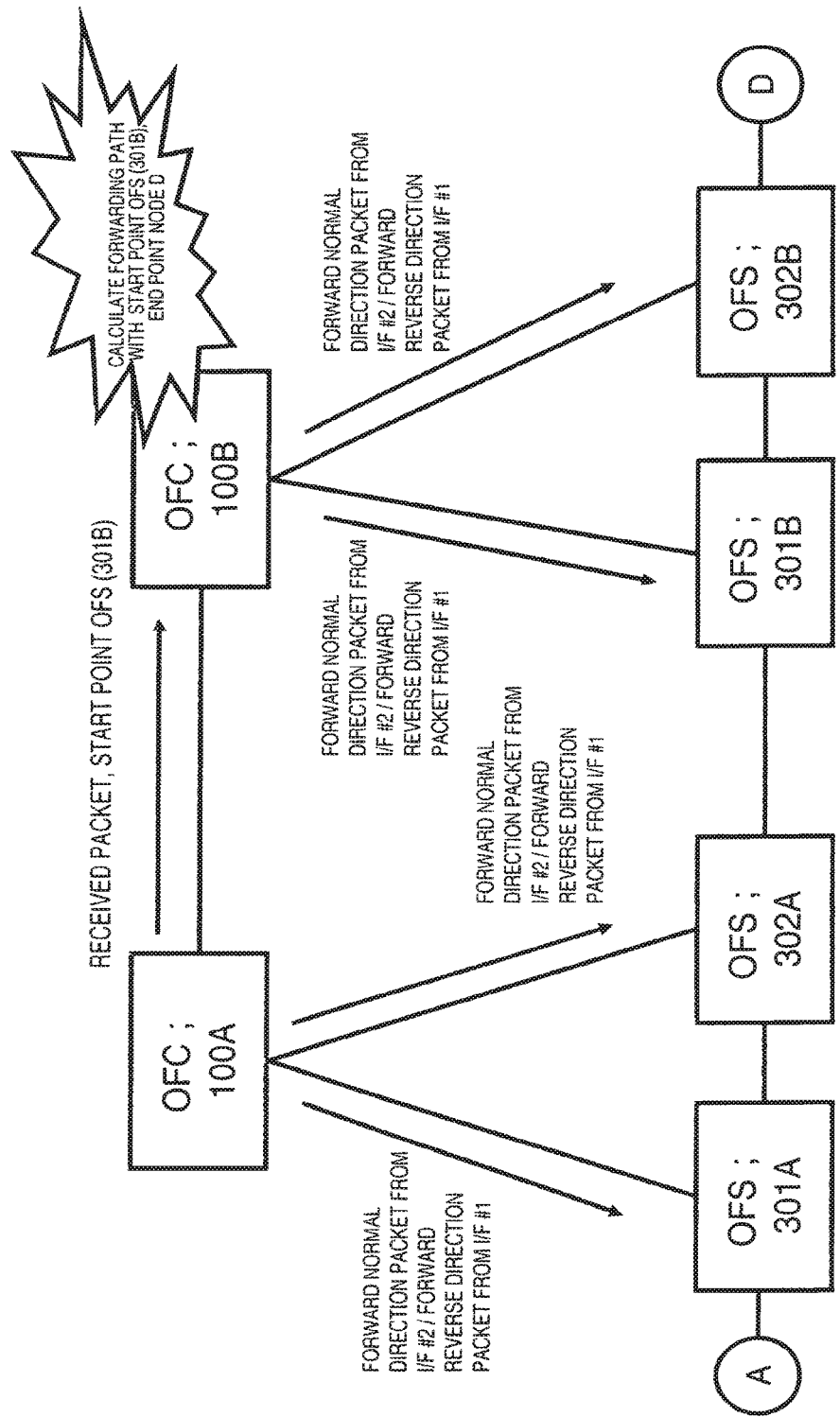
FIG. 21 is a diagram for describing a fifth exemplary embodiment of the present invention.

FIG. 21 is a diagram representing an outline operation of the fifth exemplary embodiment of the present invention. With regard to FIG. 13 used in the description of the first exemplary embodiment, a point is that an OFC 100A transmits a new packet and an OFS (301B) that is a start point for which an OFC 100B calculates a forwarding path, not forwarding path information. The OFC 100B generates a forwarding path from the OFS 301B that has been specified as the start point, as far as a destination node (node D), and performs transmission (setting) of a processing rule (flow entry) corresponding thereto to an OFS connected to the OFC 100B.

(Method of Setting a Distributed Processing Rule (Flow Entry))

Figure 22:
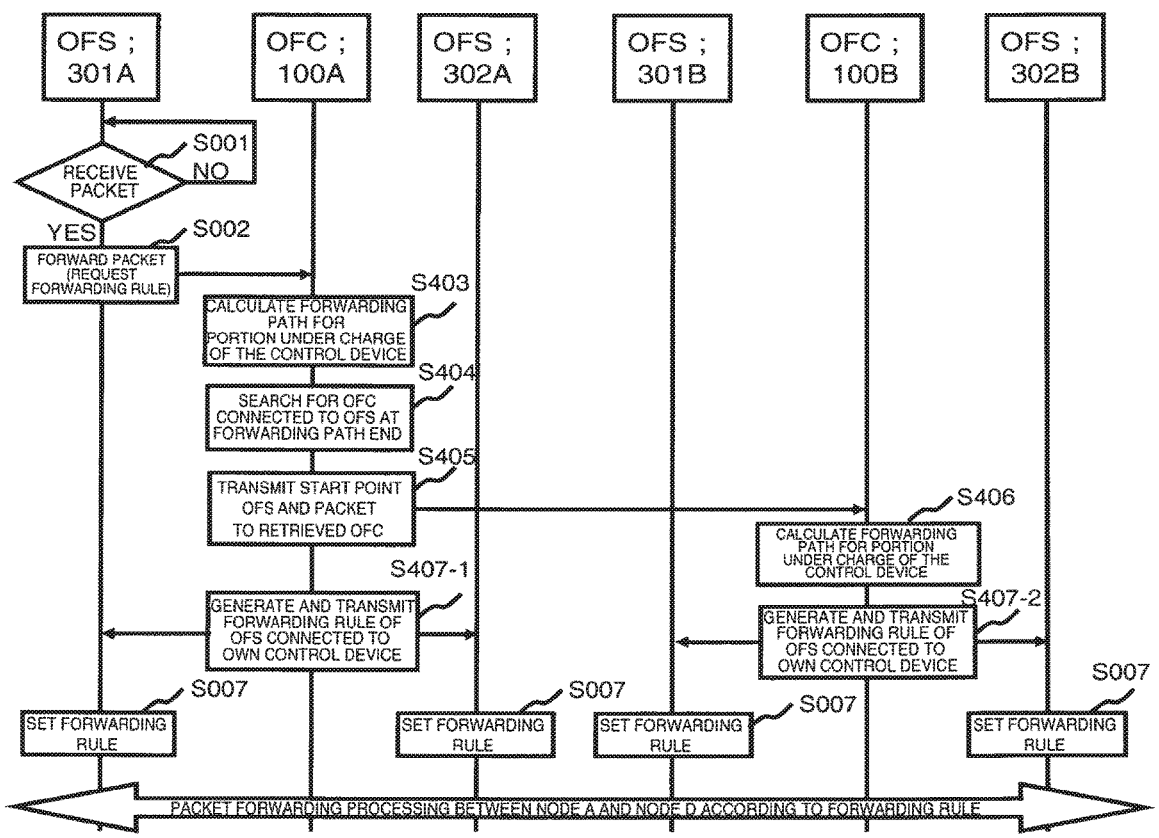
FIG. 22 is a sequence diagram illustrating an operation of the fifth exemplary embodiment of the present invention.

Next, a detailed description is given concerning an operation of the present exemplary embodiment, making reference to the drawings. FIG. 22 is a sequence diagram representing the operation of the present exemplary embodiment.

Operation as far as where the OFS 301A receives a new packet (step S001) and requests the OFC 100A, which is connected to the OFS 301A, to transmit (set) a processing rule (flow entry) including the new packet (step S002) is the same as in the first exemplary embodiment. It is to be noted that in the present exemplary embodiment, in step S001, in a case of receiving a packet that matches a processing rule (flow entry) stored in a flow table 34 of the OFS 301A, the following processing is not performed but packet forwarding processing according to a node processing rule is performed, as shown in the lowest portion of FIG. 22.

The OFC 100A, to which a request for transmission (setting) of the processing rule (flow entry) is made, refers to network topology of a topology DB 15, based on the request source OFS 301A and node D that is a destination of the new packet, in the path calculation unit 12, and calculates a forwarding path in a sequential flow including the packet forwarded from the OFS 301A (step S403). Here, the OFC 100A does not calculate all forwarding paths from node A to node D, but calculates a partial forwarding path showing which OFS connected to the own OFC (100A) is to be passed through in the forwarding and from which interface output is to made.

Next, the OFC 100A refers to a correspondence between OFS and OFC, stored in an OFS-OFC correspondence management unit 16, and searches for an OFC connected to an OFS (a start point OFS of a segment for which a forwarding path has not been calculated) that is connected to an output interface of an OFS that is an end of the calculated forwarding path (step S404). Here, the OFC 100B that is connected to the OFS 301B of FIG. 21 is retrieved.

The OFC 100A transmits, to the OFC 100B, an OFS (a start point OFS of a segment for which a forwarding path has not been calculated) that is connected to an output interface of an OFS that is an end of the calculated forwarding path, and a new packet received in step S001 (step S405).

The OFS that is a start point OFS of the segment for which a forwarding path has not been calculated and the OFC 100B that receives a new packet received in step S001 refer to the network topology of the topology DB 15, based on the OFS 301B that is specified as start point and node D that is a destination of the new packet, in the path calculation unit 12, to calculate a forwarding path according to an OFS group connected to the OFC 100B (step S406). Here, the OFC 100B calculates a forwarding path for forwarding from the OFS 301B to the OFS 302B, and forwarding from an interface #2 of the OFS 302B to node D.

Thereafter, the OFC 100A refers to the network topology of the topology DB 15 and information of the OFS connected to the OFC 100A, generates a processing rule (flow entry) to be set in an OFS in the forwarding path, among OFSs connected to the OFC 100A, and performs transmission (setting) with respect to the OFSs 301A and 302A (step S407-1).

In the same way, the OFC 100B also refers to the network topology of the topology DB 15 and information of the OFS connected to the OFC 100B, generates a processing rule (flow entry) to be set in an OFS in the forwarding path, among OFSs connected to the own control device OFC (100B), and performs transmission (setting) to the OFSs 301B and 302B (step S407-2).

Thereafter, in each of the OFSs 301A, 302A, 301B and 302B, processing is performed to register or update the received processing rule (flow entry) in the flow table 34 (step S007).

From the above, in each of the OFSs 301A, 302A, 301B and 302B, a processing rule corresponding to the calculated forwarding path is set (refer to FIG. 11), and packet forwarding between node A and node B becomes possible.

As described above, according to the present exemplary embodiment, it is possible to perform the forwarding path calculation by distributing the calculation to several OFCs. Furthermore, since the abovementioned configuration is used, it is possible to dispose the topology DB 15 in a distributed manner.

In addition, the present exemplary embodiment can be configured in a combination with the second to the fourth exemplary embodiments as described above. For example, if a combination is made with the third exemplary embodiment, a modified embodiment is possible in which the OFC 100A uses a cached forwarding path, and path calculation is performed by the OFC 100B and following. In the same way, if a combination is made with the fourth exemplary embodiment, a modified embodiment is possible in which the OFC 100A uses a speculative forwarding path calculated in advance, and path calculation is performed by the OFC 100B and following.

A description has been given above of preferred exemplary embodiments of the present invention and specific operations thereof, but the present invention is not limited to the abovementioned exemplary embodiments, and further modifications, substitutions, and adjustments can be added within a scope that does not depart from a fundamental technological concept of the present invention.

For example, in the abovementioned respective exemplary embodiments, a description was given citing examples using OFCs and OFSs, making use of technology of Non-Patent Documents 1 and 2, but realization is possible with various types of forwarding nodes and control devices that respectively perform equivalent operations.

For example, in the first to fourth exemplary embodiments described above, a description was given in which each OFC is respectively provided with a path calculation unit 12. However, as may be understood from the abovementioned description, forwarding path calculation processing does not occur in OFCs on a side receiving forwarding path information. Therefore, the path calculation unit 12 in OFCs where the forwarding path calculation processing does not occur regularly can be omitted. For a similar reason, it is possible to omit a path acceptance unit 19 from OFCs that do not receive the forwarding path information.

What is claimed is:

1. A communication system, comprising:
a first control device;
a second control device;
a first node group that is associated with the first control device and processes a received packet based on a first processing rule that is notified from the first control device; and
a second node group that is associated with the second control device and processes the received packet based on a second processing rule that is notified from the second control device,
wherein the first control device generates path information including at least information that indicates a forwarding path of the received packet, and transmits the path information to the second control device,
the path information includes information for generating the second processing rule for notification to nodes in the second node group, and
the second control device transmits the second processing rule for notification to the nodes in the second node group on the forwarding path of the received packet.

2. The communication system according to claim 1, wherein the first control device notifies the first processing rule to respective nodes in the first node group on the forwarding path of the received packet based on the path information that the first control device has generated; and
the second control device notifies the second processing rule to respective nodes in the second node group on the forwarding path of the received packet based on the path information received from the first control device.

3. The communication system according to claim 1, wherein the first control device refers to a network topology describing at least connections in among forwarding nodes in the first node group and generates the path information.

4. The communication system according to claim 1, wherein the path information includes forwarding information that is calculated in advance for a combination of a start point node and an end point node that are arbitrarily selected.

5. The communication system according to claim 4, wherein the forwarding path is cached for a predetermined time period, and calculation of a forwarding path is omitted when a combination of an identical start point node and end point node is cached.

6. A first control device, associated with a first node group in a network comprising the first node group and a second node group;

the first node group is associated with the first control device and processes a received packet based on a first processing rule that is notified from the first control device; and the second node group is associated with a second control device and processes the received packet based on a second processing rule notified from the second control device, wherein the first control device comprises:

a processor that generates path information including at least information that indicates a forwarding path of the received packet, and transmits the path information to the second control device, wherein the path information includes information for generating the second processing rule for notification to nodes in the second node group; and the second control device transmits the second processing rule for notification to the nodes in the second node group on the forwarding path of the received packet.

7. A second control device, associated with a second node group in a network comprising a first node group and the second node group;

the first node group is associated with a first control device and processes a received packet based on a first processing rule that is notified from the first control device; and the second node group is associated with a second control device and processes the received packet based on a second processing rule notified from the second control device, wherein the first control device comprises:

a processor that notifies the processing rule to respective nodes in the second node group on a forwarding path of the received packet based on the path information received from the first control device; and the second control device transmits the second processing rule for notification to the nodes in the second node group on the forwarding path of the packet.

8. A node control method, used in a first control device associated with a first node group in a network including the first node group and a second node group;

the first node group is associated with the first control device and processes a received packet based on a first processing rule that is notified from the first control device; and the second node group is associated with a second control device and processes the received packet based on a second processing rule notified from the second control device, to perform the node control method, comprising:

generating path information including at least information that indicates a forwarding path of the received packet; and transmitting the path information to the second control device, wherein the path information includes information for generating the second processing rule for notification to nodes in the second node group; and transmitting, by the second control device, the second processing rule for notification to the nodes in the second node group on the forwarding path of the packet.

9. A node control method, used in a second control device associated with a second node group in a network including a first node group and the second node group;

the first node group is associated with a first control device and processes a received packet based on a first processing rule that is notified from the first control device; and the second node group is associated with a second control device and processes the received packet based on a second processing rule notified from the second control device, to perform the node control method, comprising:

receiving path information from the first control device; and notifying the second processing rule to respective nodes in the second node group on a forwarding path of the received packet based on the path information received from the first control device; and transmitting, by the second control device, the second processing rule for notification to the nodes in the second node group on the forwarding path of the packet.

* * * * *

UNITED STATES PATENT AND TRADEMARK OFFICE
CERTIFICATE OF CORRECTION

PATENT NO. : 10,200,307 B2  
APPLICATION NO. : 15/266183  
DATED : February 5, 2019  
INVENTOR(S) : Yamato et al.

Page 1 of 1

It is certified that error appears in the above-identified patent and that said Letters Patent is hereby corrected as shown below:

In the Claims

Claim 3, Column 20, Line 53, "connections in among forwarding nodes" should read -- connections in forwarding nodes --.

Signed and Sealed this  
Ninth Day of July, 2019

Andrei Iancu  
*Director of the United States Patent and Trademark Office*